(12) United States Patent
Kitamura et al.

(10) Patent No.: US 7,018,455 B2
(45) Date of Patent: Mar. 28, 2006

(54) INK COMPOSITION, RECORDING MEDIUM, INK JET RECORDING METHOD, AND PRINTED MATTER

(75) Inventors: Kazuhiko Kitamura, Nagano-ken (JP); Yasuhiro Oki, Nagano-ken (JP); Tetsuya Aoyama, Nagano-ken (JP); Kyoichi Oka, Nagano-ken (JP); Nobuo Uotani, Chiba-ken (JP); Hiroshi Takahashi, Chiba-ken (JP); Yuji Ito, Chiba-ken (JP)

(73) Assignee: Seiko Epson Corporation, Tokyo (JP)

( * ) Notice: Subject to any disclaimer, the term of this patent is extended or adjusted under 35 U.S.C. 154(b) by 176 days.

(21) Appl. No.: 10/103,651

(22) Filed: Mar. 21, 2002

(65) Prior Publication Data

US 2003/0070582 A1 Apr. 17, 2003

(30) Foreign Application Priority Data

Mar. 30, 2001 (JP) ...................................... 2001-102705
Mar. 30, 2001 (JP) ...................................... 2001-102707

(51) Int. Cl.
*C09D 11/00* (2006.01)
*B32B 3/00* (2006.01)
*B41J 2/01* (2006.01)

(52) U.S. Cl. ................................ 106/31.46; 106/31.47; 106/31.49; 106/31.76; 106/31.77; 106/31.78; 106/31.43; 106/31.75; 428/32.1; 347/100

(58) Field of Classification Search .............. 106/31.46, 106/31.47, 31.49, 31.76, 31.77, 31.78, 31.43, 106/31.75; 428/32.1; 347/100; 283/45
See application file for complete search history.

(56) References Cited

U.S. PATENT DOCUMENTS

| | | | | |
|---|---|---|---|---|
| 4,295,889 A | | 10/1981 | Eida et al. | 106/315.2 |
| 6,100,315 A | | 8/2000 | Kitamura et al. | |
| 2001/0021440 A1 | * | 9/2001 | Hanmura et al. | 428/195 |
| 2002/0050226 A1 | * | 5/2002 | Oki et al. | 106/31.46 |
| 2002/0185036 A1 | * | 12/2002 | Oki et al. | 106/31.46 |

FOREIGN PATENT DOCUMENTS

| | | |
|---|---|---|
| EP | 0909798 | 4/1999 |
| EP | 0911374 | 4/1999 |
| EP | 1174476 | 1/2002 |
| JP | 11170686 | 6/1999 |

OTHER PUBLICATIONS

English translation of JP11/170686, Jun. 1999.*
Sirbiladze, K.J., et al., "The Role of Free Radical Transformation in the Photodegradation of Reactive Dyed Cellulosic Textiles," Dyes and Pigments, vol. 19 (1992) pp. 235–249, no month available.
Hamada, K., et al., "Mobility of Anionic Spin Probes in Water–Containing Nylon 6 Film," Journal of Polymer Science, Part B: Polymer Physics, vol. 25, No. 6, pp. 1299–1310, Jun. 1987.
Hamada, K., et al., "Mobility Of Spin Probes Having an Amide Group In Nylon Films," Polymer Science, vol. 29, No. 1, pp 93–98, Jan. 1988.
Derwent English Abstract of JP 11 170686 Dated Jun. 29, 1999.
Patent Abstracts of Japan Publication No. 11–170686 dated Jun. 29, 1999.

* cited by examiner

*Primary Examiner*—Helene Klemanski
(74) *Attorney, Agent, or Firm*—Ladas and Parry LLP

(57) ABSTRACT

An ink composition, a recording medium or printed matter containing a compound expressed by General Formula 1

(1)

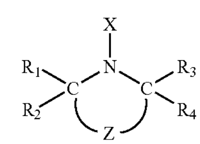

The compound has a weight reduction after 1 hour at 60°C. of no more than 1%. This makes it possible to provide the ink composition, a recording medium, printed matter, and an ink jet recording method wherein a light resistance of the printed matter is excellent, there is no ink clogging, and a high-quality image with almost no yellowing of the printed matter can be obtained.

27 Claims, No Drawings

INK COMPOSITION, RECORDING MEDIUM, INK JET RECORDING METHOD, AND PRINTED MATTER

BACKGROUND OF THE INVENTION

1. Field of the Invention

The present invention relates to an ink composition, a recording medium, an ink jet recording method, and printed matter, and more particularly relates to an ink composition, a recording medium, an ink jet recording method with which the optical stability (light resistance) of the printed matter is excellent, there is no ink clogging, the yellowing resistance of the printed matter is excellent, and a high-quality image can be obtained.

2. Description of the Related Art

Ink jet recording is a printing method in which tiny drops of an ink composition are ejected and made to adhere to a recording medium such as paper. A feature of this method is that images of high quality and resolution can be printed at high speed with a relatively inexpensive apparatus.

Various ink compositions have been proposed in the past for use in recording by this ink jet recording method.

There has been increasing need in recent years for better weatherproofness (particularly light resistance) of recorded images, and to this end there have been attempts at adding light stabilizers such as hindered amine compounds to ink compositions.

For instance, Dyes and Pigments 19 (1992, pp. 235–247) discusses that the photodegradation of a dye can be prevented by adding 2,2,6,6-tetramethyl-4-hydroxypiperidin-1-oxyl (a hindered amine-based light stabilizer) to an aqueous solution containing this dye. Japanese Laid-Open Patent Application H11–170686, which was published in a later issue of the above journal (Dyes and Pigments 19) discloses a technique for stabilizing a water-soluble dye by adding a specific compound (the above-mentioned 2,2,6,6-tetramethyl-4-hydroxypiperidin-1-oxyl or a derivative thereof) to a water-based ink jet recording liquid containing this water-soluble dye. This compound serves to halt the progress of a photo-oxidation reaction of a colorant and thereby prevent photodegradation by trapping radicals such as R• (alkyl radicals) produced by the optical excitation of carbonyl compounds and the like, or ROO• (peroxide radicals) produced by a reaction between R• and the oxygen in the air. Printed matter produced by ink jet recording using this recording liquid has outstanding light resistance.

However, while the light resistance of a recorded image is indeed improved by using an ink composition that contains the above-mentioned light stabilizer, a new problem is encountered in that if the printed matter is stored in a file equipped with a film containing an antioxidant composed of a specific phenol derivative, or if such a film is applied to the printed matter, the printed matter will yellow due to the effect of the light stabilizer.

The reason for this is believed to be that the specific phenol derivative reacts through the action of the hindered amine compound or other such light stabilizer contained in the ink composition fixed to the recording medium. BHT (2,6-di-tert-butyl-4-methylphenol) is an example of this specific phenol derivative.

Specifically, the above-mentioned phenol derivative contained in the film is sublimable and therefore migrates from the film to the printed matter, the action of the light stabilizer in the printed matter brings about the dimerization and quinonization of the phenol derivative, and the resulting reaction product is the cause of the yellowing of the printed matter. It is believed that this reaction is particularly pronounced and yellowing especially apt to occur when the light stabilizer has oxy radicals.

Even if the compound used as the light stabilizer does not have any oxy radicals, an oxidation reaction in the course of the printed matter being stored in the air can generate oxy radicals in the compound serving as the light stabilizer, so the yellowing reaction still proceeds, albeit more slowly, and the printed matter still ends up yellowing.

SUMMARY OF THE INVENTION

It is therefore an object of the present invention to provide an ink composition, a recording medium, an ink jet recording method, and printed matter with which the light resistance of the printed matter is excellent, there is no ink clogging, and a high-quality image with almost no yellowing of the printed matter can be obtained.

As a result of diligent research, the inventors learned that printed matter with excellent light resistance, clogging resistance, and yellowing resistance can be obtained by using an ink composition comprising a colorant, water, and a compound expressed by the General Formula 1 discussed below, whose weight reduction after 1 hour at 60° C. is no more than 1 wt %.

The inventors also learned that printed matter with excellent light resistance and yellowing resistance can be obtained if the recording medium has a receiving layer, and if this receiving layer contains a compound expressed by the above-mentioned General Formula 1, whose weight reduction after 1 hour at 60° C. is no more 1 wt %.

The present invention was conceived on the basis of this knowledge, and provides an ink composition comprising a colorant, water, and a compound expressed by the above-mentioned General Formula 1, whose weight reduction after 1 hour at 60° C. is no more than 1 wt %; and also provides a recording medium having a receiving layer containing a compound expressed by the above-mentioned General Formula 1, whose weight reduction after 1 hour at 60° C. is no more than 1 wt %. The present invention further provides printed matter obtained by using this ink composition and/or this recording medium, and a recording method using the same.

As mentioned above, one of the causes of yellowing of printed matter is that the phenol derivative in the film sublimates and migrates into the printed matter, where it reacts with the compound expressed by General Formula 1, which is added as a light stabilizer. The present invention was conceived in light of the discovery that another cause of the yellowing of printed matter is that the compound expressed by General Formula 1 is also sublimable, and that yellowing of the printed matter can be prevented by adjusting the proportional evaporation of this compound (its weight reduction) to a specific value. The present invention is characterized in that the weight reduction of the compound expressed by General Formula 1 is set to a specific value, and there are no particular restrictions on the compound expressed by General Formula 1 as long as this specific value is attained.

In the above, it is preferable for the compound expressed by General Formula 1 to have a water-soluble group W (where W is a $-SO_2NH_2$ group, $-NHCOCH_3$ group, $-CONH_2$ group, $-C{=}NH(NH_2)$ group, $-NHC{=}NH(NH_2)$ group, $-SO_3H$ group, sulfuric ester group, $-P(O)(OH)(OR)$, $-P(O)(OR)_2$, carbamoyl group or salt thereof, salt of a carboxyl group, salt of an amino group, salt of a phenolic hydroxyl group, polyethylene glycol ether group, salt of —C═NH($NH_2$), or salt of —NHC═NH($NH_2$) (R is an alkyl group or aryl group)).

In the above-mentioned compound expressed by General Formula 1, it is preferable for Z to be a group of nonmetal atoms necessary to complete a six-member ring.

The above-mentioned compound expressed by General Formula 1 is preferably contained in the ink composition in an amount of at least 0.05 wt % and no more than 10 wt %.

The above-mentioned ink composition may further include a penetrant and/or a humectant.

The above constitution prevents the dimerization and quinonization of the phenol derivative, so the resulting printed matter has excellent light resistance and excellent yellowing resistance.

In order to ensure sufficient ink absorption by the recording medium and obtain yellowing resistance, it is preferable for the compound expressed by General Formula 1 to be contained in the above-mentioned recording medium of the present invention in an amount of at least 0.01 wt % and no more than 10 wt % with respect to the total weight of the above-mentioned ink receiving layer, with a range of at least 0.5 wt % and no more than 5 wt % being even better.

The ink jet recording method of the present invention involves discharging droplets of an ink composition and causing these droplets to adhere to a recording medium, and is characterized by the use of the above-mentioned ink composition as this ink composition.

Also, the ink jet recording method of the present invention involves discharging droplets of an ink composition and causing these droplets to adhere to a recording medium, and is characterized by the use of the above-mentioned recording medium as this recording medium.

Using these recording methods makes it possible to obtain printed matter with excellent light resistance and excellent yellowing resistance.

Also, as a result of diligent research, the inventors discovered that printed matter with excellent light resistance, clogging resistance, and yellowing resistance can be obtained if the ink composition further contains at least one type of a specific compound A.

The hydrazide compound in the present invention refers to corresponding carboxylic esters, acid halides, thiocarboxylic acids and other such acid derivatives, or sulfonic acid, chlorosulfonic acid, and other such sulfone derivatives, or a compound having a —$CXNHNR^8R^9$ (where $R^8$ and $R^9$ are each a hydrogen, alkyl group, or aryl group, and X is S or O) group or a —$SO_2NHNR^8R^9$ (where $R^8$ and $R^9$ are each a hydrogen, alkyl group, or aryl group), obtained by a condensation reaction between an isocyanate or diisocyanate and a hydrazine compound expressed by the general formula $NH_2NR^8R^9$ (where $R^8$ and $R^9$ are each a hydrogen, alkyl group, or aryl group).

The inventors also learned that printed matter with excellent light resistance and yellowing resistance can be obtained if the above-mentioned receiving layer further contains at least one type of a specific compound A.

The present invention was conceived on the basis of the above knowledge, and provides an ink composition comprising a colorant, water, a compound expressed by the following General Formula 1, whose weight reduction after 1 hour at 60° C. is no more than 1%, and at least one type of compound A selected as desired from among the three groups numbered I to III below; and also provides a recording medium having a receiving layer containing a compound expressed by the following General Formula 1, whose weight reduction after 1 hour at 60° C. is no more than 1%, and at least one type of compound A selected as desired from among the three groups numbered I to III below.

Group I: hydrazide compounds

Group II: tertiary amine compounds

Group III: inorganic salts expressed by $MS_2O_4$, $MSO_3$, $MS_2O_3$, $MPH_2O_2$, and $MPHO_3$ (where M is an alkali metal or alkaline earth metal)

The present invention further provides printed matter obtained using this ink composition and/or recording medium, and a recording method.

One of the causes of yellowing of printed matter is that the phenol derivative in the film sublimates and migrates into the printed matter, where it reacts with the compound expressed by General Formula 1, which is added as a light stabilizer. The present invention was conceived in light of the discovery that another cause of the yellowing of printed matter is that the compound expressed by General Formula 1 is also sublimable, and that yellowing of the printed matter can be prevented by adjusting the proportional evaporation of this compound (its weight reduction) to a specific value, and adding a specific additive. There are no particular restrictions on the compound expressed by General Formula 1 as long as the weight reduction attains this specific value.

In the above, it is preferable for the compound expressed by General Formula 1 to have a water-soluble group W (where W is a —$SO_2NH_2$ group, —$NHCOCH_3$ group, —$CONH_2$ group, —C═NH($NH_2$) group, —NHC═NH($NH_2$) group, —$SO_3H$ group, sulfuric ester group, —P(O)(OH)(OR), —P(O)$(OR)_2$, carbamoyl group or salt thereof, salt of a carboxyl group, salt of an amino group, salt of a phenolic hydroxyl group, polyethylene glycol ether group, salt of —C═NH($NH_2$), or salt of —NHC═NH($NH_2$) (R is an alkyl group or aryl group)).

In the above-mentioned compound expressed by General Formula 1, it is preferable for Z to be a group of nonmetal atoms necessary to complete a six-member ring.

In the above-mentioned compound expressed by General Formula 1, X may be an oxy radical.

In order to obtain sufficient light resistance, clogging resistance, and yellowing resistance, it is preferable for the above-mentioned compound A to be contained in the above-mentioned ink composition in an amount of at least 0.01 wt % and no more than 10 wt %, with a range of at least 0.5 wt % and no more than 5 wt % being even better.

In order to obtain sufficient light resistance, clogging resistance, and yellowing resistance, it is preferable for the above-mentioned compound expressed by General Formula 1 to be contained in the above-mentioned ink composition in an amount of at least 0.05 wt % and no more than 10 wt % with respect to the total amount of ink, with a range of at least 0.5 wt % and no more than 5 wt % being even better.

From the standpoint of increasing the yellowing resistance of the printed matter, it is preferable if the compound expressed by General Formula 1 and compound A are present in a weight ratio (former/latter) of at least 1:25 and no more than 5:1, with at least 1:5 and no more than 3:1 being particularly favorable.

In the above, the hydrazide compound is preferably a compound expressed by the general formula $R^5CXNHNR^6R^7$ (where $R^5$ is an alkyl group or aryl group; $R^6$ and $R^7$ are a hydrogen, alkyl group, or aryl group; and X is S or O), or the general formula $R^5SO_2NHNR^6R^7$ (where $R^5$ is an alkyl group or aryl group; and $R^6$ and $R^7$ are a hydrogen, alkyl group, or aryl group), or the general formula $R^5NHCXNHNR^6R^7$ (where $R^5$ is an alkyl group or aryl group; $R^6$ and $R^7$ are a hydrogen, alkyl group, or aryl group; and X is S or O).

The hydrazide compound may have two or more hydrazide structures per molecule.

In the above, the tertiary amine compound is preferably a compound expressed by the general formula $R^5R^6R^7N$ (where $R^5$, $R^6$, and $R^7$ are each a substitutable alkyl group, aryl group, or aralkyl group), or a substitutable cyclic tertiary amine.

In the above, the inorganic salt is one or more inorganic salts selected from the group consisting of compounds expressed by $MS_2O_4$, $MSO_3$, $MS_2O_3$, $MPH_2O_2$, and $MPHO_3$ (where M is an alkali metal or alkaline earth metal).

The inorganic salt is preferably a potassium salt or sodium salt.

When compound A is selected from group I and used as an additive, it has the effect of giving the printed matter excellent light resistance, clogging resistance, and yellowing resistance, as well as improving the gas resistance of the printed matter.

The above-mentioned ink composition may further comprise a penetrant and/or a humectant.

The above constitution prevents the dimerization and quinonization of the phenol derivative, so the resulting printed matter has excellent light resistance and excellent yellowing resistance.

In order to ensure sufficient ink absorption by the recording medium and obtain yellowing resistance, it is preferable for compound A to be contained in the above-mentioned recording medium of the present invention in an amount of at least 0.01 wt % and no more than 10 wt % with respect to the total weight of the above-mentioned ink receiving layer, with a range of at least 0.5 wt % and no more than 5 wt % being even better.

In order to ensure sufficient ink absorption by the recording medium and obtain yellowing resistance, it is preferable for the compound expressed by General Formula 1 to be contained in the above-mentioned recording medium of the present invention in an amount of at least 0.01 wt % and no more than 10 wt % with respect to the total weight of the above-mentioned ink receiving layer, with a range of at least 0.5 wt % and no more than 5 wt % being even better.

In order to ensure sufficient ink absorption by the recording medium and obtain yellowing resistance, it is preferable if the compound expressed by General Formula 1 and compound A are present in a weight ratio (former/latter) of at least 1:25 and no more than 5:1, with at least 1:5 and no more than 3:1 being particularly favorable.

The ink jet recording method of the present invention involves discharging droplets of an ink composition and causing these droplets to adhere to a recording medium, and is characterized by the use of the above-mentioned ink composition as this ink composition.

Also, the ink jet recording method of the present invention involves discharging droplets of an ink composition and causing these droplets to adhere to a recording medium, and is characterized by the use of the above-mentioned recording medium as this recording medium.

The ink jet recording method of the present invention involves discharging droplets of an ink composition and causing these droplets to adhere to a recording medium, and is characterized by the use of the above-mentioned ink composition as this ink composition, and by the use of a recording medium in which an ink receiving layer is provided over a substrate, and which contains compound A in this ink receiving layer, as this recording medium.

The ink jet recording method of the present invention involves discharging droplets of an ink composition and causing these droplets to adhere to a recording medium, and is characterized by the use of an ink composition containing a colorant, water, and compound A as this ink composition, and by the use of the above-mentioned recording medium as this recording medium.

Using these recording methods makes it possible to obtain printed matter with excellent light resistance and excellent yellowing resistance.

The inventors conducted further research on the basis of these inventions, and as a result discovered that printed matter with excellent light resistance, clogging resistance, and yellowing resistance is similarly obtained when the above-mentioned compound expressed by General Formula 1, whose weight reduction after 1 hour at 60° C. is no more than 1%, is contained in the ink composition, and when at least one type of a specific compound A is contained in the recording medium.

Specifically, the ink jet recording method of the present invention is characterized in that the ink composition comprises a colorant, water, and a compound expressed by the following General Formula 1, whose weight reduction after 1 hour at 60° C. is no more than 1%, and the recording medium contains at least one type of compound A selected as desired from among the three groups numbered I to III above.

The ink jet recording method of the present invention involves discharging droplets of an ink composition and causing these droplets to adhere to a recording medium, and is characterized by the use of an ink composition containing a colorant, water, and the above-mentioned compound expressed by the following General Formula 1, whose weight reduction after 1 hour at 60° C. is no more than 1%, as this ink composition, and by the use of the above-mentioned recording medium as this recording medium.

In order to ensure sufficient ink absorption by the recording medium and obtain yellowing resistance in the above-mentioned recording method of the present invention, it is preferable for compound A to be contained in an amount of at least 0.01 wt % and no more than 10 wt % with respect to the total weight of the above-mentioned ink receiving layer, with a range of at least 0.5 wt % and no more than 5 wt % being even better.

In order to ensure sufficient ink absorption by the recording medium and obtain yellowing resistance in the above-mentioned recording method of the present invention, it is preferable the compound expressed by General Formula 1 to be contained in an amount of at least 0.05 wt % and no more than 10 wt % with respect to the total weight of the above-mentioned ink receiving layer, with a range of at least 0.5 wt % and no more than 5 wt % being even better. It is also preferable for the compound A content to be at least 0.01 wt % and no more than 10 wt %.

Using these recording methods makes it possible to obtain printed matter with excellent light resistance and excellent yellowing resistance.

DESCRIPTION OF THE PREFERRED EMBODIMENTS

Ink Composition

Preferred embodiments of the ink composition of the present invention will now be described.

The ink composition pertaining to the present invention is characterized by comprising a colorant, water, and a compound expressed by the above-mentioned General Formula 1, wherein the weight reduction in the compound expressed by said General Formula 1 after 1 hour at 60° C. is no more than 1%.

(1)

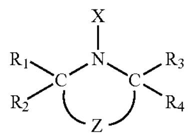

(In General Formula 1, X is a hydrogen, oxy radical, hydroxyl group, alkyl group, alkenyl group, alkynyl group, aryl group, acyl group, sulfonyl group, sulfinyl group, alkoxy group, aryloxy group, or acyloxy group; $R^1$, $R^2$, $R^3$, and $R^4$ are each a hydrogen or alkyl group; Z is a group of nonmetal atoms necessary to complete a five- to seven-member ring; and any two groups out of $R^1$ to $R^4$ and Z may bond together to form a five- to seven-member ring.)

The compound expressed by General Formula 1 is preferably a compound expressed by the following general formula, having a water-soluble group W.

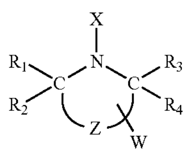

(Where W is a —$SO_2NH_2$ group, —$NHCOCH_3$ group, —$CONH_2$ group, —C═NH($NH_2$) group, —NHC═NH($NH_2$) group, —$SO_3H$ group, sulfuric ester group, —P(O)(OH)(OR) , —P(O)$(OR)_2$, carbamoyl group or salt thereof, salt of a carboxyl group, salt of an amino group, salt of a phenolic hydroxyl group, polyethylene glycol ether group, salt of —C═NH($NH_2$), or salt of —NHC═NH($NH_2$)(R is an alkyl group or aryl group); X is a hydrogen, oxy radical, hydroxyl group, alkyl group, alkenyl group, alkynyl group, aryl group, acyl group, sulfonyl group, sulfinyl group, alkoxy group, aryloxy group, or acyloxy group; $R^1$, $R^2$, $R^3$, and $R^4$ are each a hydrogen or alkyl group; Z is a group of nonmetal atoms necessary to complete a five- to seven-member ring; and any two groups out of $R^1$ to $R^4$ and Z may bond together to form a five- to seven-member ring.)

Examples of the alkyl group expressed by X in General Formula 1 include a methyl group, ethyl group, n-propyl group, iso-propyl group, n-butyl group, tert-butyl group, n-octyl group, benzyl group, and hexadecyl group; examples of the alkenyl group include an aryl group and oleyl group; examples of the alkynyl group include an ethynyl group; examples of the aryl group include a phenyl group and naphthyl group; examples of the acyl group include an acetyl group, benzoyl group, and pentanoyl group; examples of the sulfonyl group include a methanesulfonyl group, benzenesulfonyl group, and toluenesulfonyl group; examples of the sulfinyl group include a methanesulfinyl group and benzenesulfinyl group; examples of the alkoxy group include a methyloxy group, ethyloxy group, i-propyloxy group, n-butyloxy group, cyclohexyloxy group, n-octyloxy group, 1-octyloxy group, and benzyloxy group; examples of the aryloxy group include a phenoxy group; and examples of the acyloxy group include an acetyloxy group and benzoyloxy group. All of these groups may have substituents, and examples of such substituents include a sulfonyl group, carboxyl group, and hydroxy group. It is particularly favorable for X to be an oxy radical.

As mentioned above, $R^1$, $R^2$, $R^3$, and $R^4$ in General Formula 1 are each a hydrogen or alkyl group. This alkyl group is selected from the same set as the alkyl group expressed by the above-mentioned X. A methyl group is particularly favorable.

It is preferable for Z in the compound expressed by General Formula 1 to be a group of nonmetal atoms necessary to complete a six-member ring.

Of the compounds expressed by General Formula 1, specific examples of those whose weight reduction after 1 hour at 60° C. is no more than 1% will now be given.

(1-1)

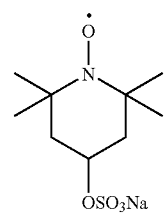

(1-2)

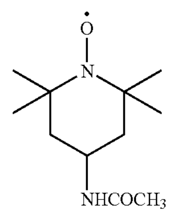

(1-3)

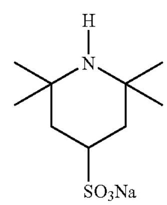

(1-4)

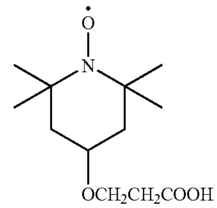

(1-5)

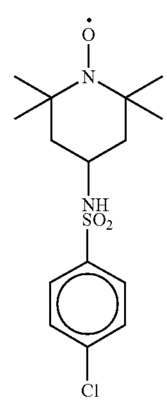

-continued (1-6)

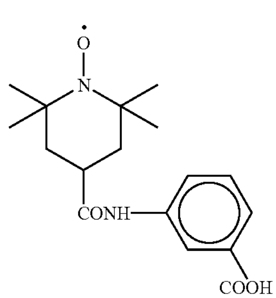

(1-7)

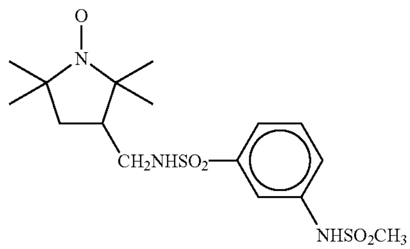

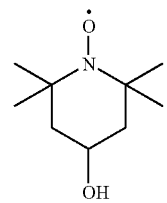

The compound expressed by General Formula 1 can be made by the methods discussed in *Journal of Polymer Science, Part B: Polymer Physics*, Vol. 25, 1299–1310 (1987), written by Kunihiro Hamada, Toshiro Iijima, and Ralph McGregor, and in *Polymer*, Vol. 29 (1), 93–98 (1988), written by Kunihiro Hamada, Toshiro Iijima, and Ralph McGregor, for example. In specific terms, the compound of Formula I-1 can be made by the first of the methods cited above, while the compound of Formula 1-2 can be made by the second of these methods.

Meanwhile, of the compounds expressed by General Formula 1, specific examples of those whose weight reduction after 1 hour at 60° C. is no more than 1% are expressed by the following.

In the present invention, the compound expressed by General Formula 1 is preferably contained in the ink composition in an amount of at least 0.05 wt % and no more than 10 wt %, and more preferably in an amount of at least 0.1 wt % and no more than 5 wt %.

Also, the ink composition pertaining to the present invention is characterized by comprising a colorant, water, a compound expressed by the following General Formula 1, and the above-mentioned compound A, wherein the weight reduction in the compound expressed by General Formula 1 after 1 hour at 60° C. is no more than 1%.

Examples of hydrazide compounds include hydrazide (acyl hydrazide), thiocarbohydrazide, and derivatives of these.

More specifically, it is preferable to use a compound expressed by the general formula $R^5CXNHNR^6R^7$ (where $R^5$ is an alkyl group or aryl group; $R^6$ and $R^7$ are a hydrogen, alkyl group, or aryl group; and X is S or O), or the general formula $R^5SO_2NHNR^6R^7$ (where $R^5$ is an alkyl group or aryl group; and $R^6$ and $R^7$ are a hydrogen, alkyl group, or aryl group), or the general formula $R^5NHCXNHNR^6R^7$ (where $R^5$ is an alkyl group or aryl group; $R^6$ and $R^7$ are a hydrogen, alkyl group, or aryl group; and X is S or O).

The yellowing resistance of the printed matter will be particularly good if the hydrazide compound has two or more hydrazide structures per molecule.

The following are specific examples of compounds expressed by the general formula $R^5CXNHNR^6R^7$, the general formula $R^5SO_2NHNR^6R^7$, or the general formula $R^5NHCXNHNR^6R^7$.

(3-1)

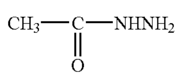

(3-2)

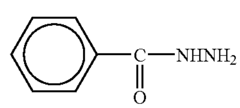

(3-3)

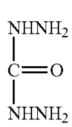

(3-4)

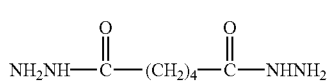

(3-5)

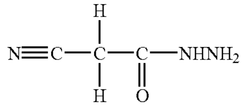

(3-6)

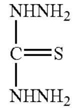

(3-7)

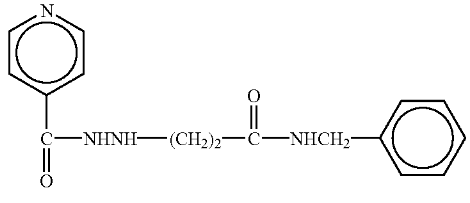

(3-8)

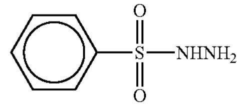

-continued (3-9)

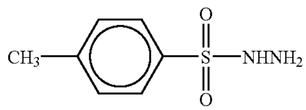

(3-10)

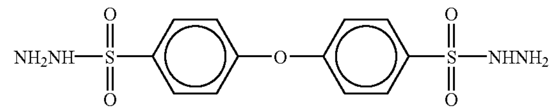

(3-11)

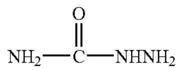

(3-12)

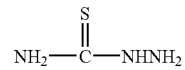

(3-13)

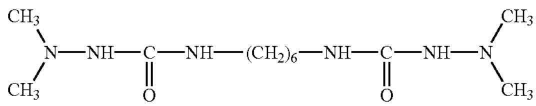

(3-14)

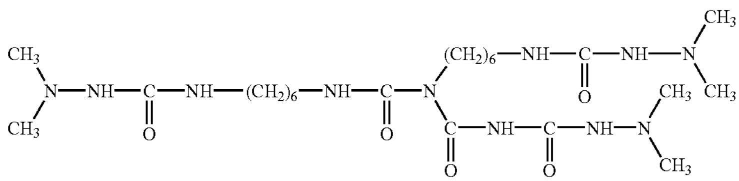

(3-15)

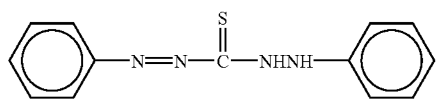

(3-16)

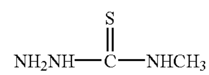

(3-17)

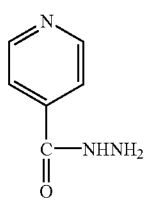

(3-18)

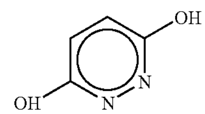

It is preferable for the hydrazide compound to be contained in the ink composition in an amount of at least 0.01 wt % and no more than 10 wt %, with at least 0.1 wt % and no more than 5 wt % being particularly favorable. Adjusting to the preferred content markedly improves the yellowing resistance of the printed matter.

In the present invention, it is preferable if the compound expressed by General Formula 1 and the hydrazide compound are present in a weight ratio (former/latter) of at least 1:25 and no more than 5:1, with at least 1:5 and no more than 3:1 being particularly favorable. Adjusting to the preferred weight ratio markedly improves the yellowing resistance of the printed matter.

The tertiary amine compound is preferably a compound expressed by the general formula $R^5R^6R^7N$ (where $R^5$, $R^6$, and $R^7$ are each a substitutable alkyl group, aryl group, or aralkyl group), or a substitutable cyclic tertiary amine.

The compound expressed by the general formula $R^5R^6R^7N$ may be one in which $R^5$, $R^6$, and $R^7$ are each individually a substitutable alkyl group, aryl group, or aralkyl group. Specific examples include triethanolamine, dimethylethanolamine, diethylethanolamine, butyldiethanolamine, methyldiethanolamine, triisopropanolamine, trimethylamine, triethylamine, tripropylamine, tributylamine, triallylamine, dimethylaniline, diethylaniline, tribenzylamine, triphenylamine, N,N-dimethylbenzylamine, N,N-dimethylphenethylamine, N,N-diethylbenzylamine, and derivatives of these. The yellowing resistance of the printed matter will be particularly good when $R^5$, $R^6$, and $R^7$ are all hydroxyalkyl groups.

Examples of the substitutable cyclic tertiary amine include 1,4-diazabicyclo[2.2.2]octane (DABCO), 1,8-diazabicyclo[5.4.0]-7-undecene (DBU), 1,5-diazabicyclo[4.3.0]-5-nonene (DBN), hexamethylenetetramine (HMTA), N-methylpiperidine, N-methylmorpholine, N-methylpyrrolidine, N-methylpyrrole, 2-methylpyridine, 2-ethylpyridine, 3-methylpyridine, 3-methylquinoline, and derivatives of these. The yellowing resistance of the printed matter will be particularly good when DABCO or HMTA is used.

These tertiary amine compounds may be used singly or in combinations.

The tertiary amine compound is preferably contained in the ink composition in an amount of at least 0.01 wt % and no more than 10 wt %, with at least 0.1 wt % and no more than 5 wt % being particularly favorable. Adjusting to the preferred content markedly improves the yellowing resistance of the printed matter.

In the present invention, it is preferable if the compound expressed by General Formula 1 and the tertiary amine compound are present in a weight ratio (former/latter) of at least 1:25 and no more than 5:1, with at least 1:5 and no more than 3:1 being particularly favorable. Adjusting to the preferred weight ratio markedly improves the yellowing resistance of the printed matter.

Examples of inorganic salts include one or more types selected from the group consisting of compounds expressed by $MS_2O_4$, $MSO_3$, $MS_2O_3$, $MPH_2O_2$, and $MPHO_3$ (where M is an alkali metal or alkaline earth metal). Potassium, sodium, and lithium are favorable as the alkali metal, and magnesium, calcium, and barium are favorable as the alkaline earth metal. It is particularly favorable for the inorganic salt of the present invention to be a potassium salt or sodium salt.

Specific examples of inorganic salts include $K_2S_2O_4$, $Na_2S_2O_4$, $Li_2S_2O_4$, $MgS_2O_4$, $CaS_2O_4$, $BaS_2O_4$, $K_2SO_3$, $Na_2SO_3$, $Li_2SO_3$, $MgSO_3$, $CaSO_3$, $BaSO_3$, $K_2S_2O_3$, $Na_2S_2O_3$, $Li_2S_2O_3$, $MgS_2O_3$, $CaS_2O_3$, $BaS_2O_3$, $KPH_2O_2$, $NaPH_2O_2$, $LiPH_2O_2$, $Mg(PH_2O_2)_2$, $Ca(PH_2O_2)_2$, $Ba(PH_2O_2)$, $K_2PHO_3$, $Na_2PHO_3$, $Li_2PHO_3$, $MgPHO_3$, $CaPHO_3$, and $BaPHO_3$. The yellowing resistance of the printed matter will be markedly improved when a potassium salt or sodium salt is used.

These inorganic salts may be used singly or in combinations.

The inorganic salt is preferably contained in the ink composition in an amount of at least 0.01 wt % and no more than 10 wt %, with at least 0.1 wt % and no more than 5 wt % being particularly favorable. Adjusting to the preferred content markedly improves the yellowing resistance of the printed matter.

In the present invention, it is preferable if the compound expressed by General Formula 1 and the inorganic salt are present in a weight ratio (former/latter) of at least 1:25 and no more than 5:1, with at least 1:5 and no more than 3:1 being particularly favorable. Adjusting to the preferred weight ratio markedly improves the yellowing resistance of the printed matter.

The compound expressed by General Formula 1 is preferably a compound having a water-soluble group W as mentioned above.

Preferred embodiments, specific examples, and the manufacturing method of the compound expressed by General Formula 1 are the same as those discussed above.

In the present invention, the compound expressed by General Formula 1 is preferably contained in the ink composition in an amount of at least 0.05 wt % and no more than 10 wt %, with at least 0.1 wt % and no more than 5 wt % being particularly favorable.

A dye or pigment can be used as the colorant.

The dye is preferably water-soluble, specific examples of which include those classified in the Color Index as acid dyes, direct dyes, catalyst dyes, reactive dyes, soluble vat dyes, sulfur dyes, and food colorings. Many of those dyes not listed in the Color Index can also be used favorably.

Specific examples of these include C.I. Direct Black 17, 19, 32, 38, 51, 62, 71, 74, 75, 112, 117, 154, 163, and 168, C.I. Acid Black 7, 24, 26, 48, 52, 58, 60, 107, 109, 118, 119, 131, 140, 155, 156, and 187, C.I. Food Black 1 and 2, C.I. Reactive Black 5, C.I. Direct Yellow 11, 28, 33, 39, 44, 58, 86, 100, 132, 142, and 330, C.I. Acid Yellow 3, 19, 23, 25, 29, 38, 49, 59, 62, and 72, C.I. Basic Yellow 11 and 51, C.I. Disperse Yellow 3 and 5, C.I. Reactive Yellow 2, C.I. Direct Red 23, 79, 80, 83, 99, 220, 224, and 227, C.I. Acid Red 1, 8, 17, 18, 32, 35, 37, 42, 52, 57, 92, 115, 119, 131, 133, 134, 154, 186, 249, 254, and 256, C.I. Basic Red 14 and 39, C.I. Disperse Red 60, C.I. Direct Blue 6, 8, 15, 25, 71, 76, 80, 86, 90, 106, 108, 123, 163, 165, 168, 199, and 226, C.I. Acid Blue 9, 29, 40, 62, 74, 102, 104, 113, 117, 120, 175, and 183, C.I. Basic Blue 41, C.I. Reactive Blue 15, C.I. Direct Violet 47, 51, 90, and 94, and C.I. Acid Violet 11, 34, and 75.

There are no particular restrictions on the pigment, which can be either an inorganic pigment or an organic pigment. Inorganic pigments that can be used include titanium oxide and iron oxide, as well as carbon black made by a known method such as a contact process, furnace process, or thermal process. The organic pigment can be an azo dye (including azo lake, insoluble azo pigments, condensed azo pigments, chelate azo pigments, and so forth), a polycyclic pigment (such as phthalocyanine pigments, perylene pigments, perinone pigments, anthraquinone pigments, quinacridone pigments, dioxazine pigments, thioindigo pigments, isoindolinone pigments, and quinophthalone pigments), a dye chelate (such as basic dye chelates and acid dye chelates), a nitro pigment, a nitroso pigment, aniline black, or the like.

In particular, the carbon black used for black ink can be No. 2300, No. 900, MCF88, No. 33, No. 40, No. 45, No. 52, MA7, MA8, MA100, No. 2200B, or the like from Mitsubishi Chemical, Raven 5750, Raven 5250, Raven 5000, Raven 3500, Raven 1255, Raven 700, or the like from Colombia, Regal 400R, Regal 330R, Regal 1660R, Mogul L, Monarch 700, Monarch 800, Monarch 880, Monarch 900, Monarch 1000, Monarch 1100, Monarch 1300, Monarch 1400, or the like from Cabot, or Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4, or the like from Degussa.

Examples of pigments used for yellow ink include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14C, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 119, C.I. Pigment Yellow 110, C.I. Pigment Yellow 114, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 180, and C.I. Pigment Yellow 185.

Examples of pigments used for red ink include C.I. Pigment Red 5, C.I. Pigment Red 7, C.I. Pigment Red 12, C.I. Pigment Red 48 (Ca), Pigment Red 48 (Mu), Pigment Red 57 (Ca), C.I. Pigment Red 57:1, C.I. Pigment Red 112, C.I. Pigment Red 122, C.I. Pigment Red 123, C.I. Pigment Red 168, C.I. Pigment Red 184, and C.I. Pigment Red 202.

Examples of pigments used for blue ink include C.I. Pigment Blue 1, C.I. Pigment Blue 2, C.I. Pigment Blue 3, C.I. Pigment Blue 15:3, C.I. Pigment Blue 15:34, C.I. Pigment Blue 15:4, C.I. Pigment Blue 16, C.I. Pigment Blue 22, C.I. Pigment Blue 60, C.I. Vat Blue 4, and C.I. Vat Blue 60.

The colorant should be added to the ink composition in an amount of at least 0.1 wt % and no more than 20 wt %, with at least 0.5 wt % and no more than 10 wt % being even better. In the case of a pigment, the particle diameter should be no more than 10 μm, and preferably no more than 0.1 μm.

Water is used as a solvent in the ink composition of the present invention. Ion exchange water, ultrafiltration water, reverse osmosis water, distilled water, or other such pure water or ultra-pure water can be used favorably for this water.

The ink composition of the present invention may also contain a penetrant and/or a humectant.

The penetrant can be any of a wide range of compounds that lower the surface tension of an ink, promote the penetration of the ink into the recording medium, and shorten the ink drying time. Examples include ethanol, propanol, isopropanol, butanol, pentanol, and other lower alcohols; ethylene glycol monoethyl ether, ethylene glycol monobutyl ether, and other such cellosolves; diethylene glycol monobutyl ether, triethylene glycol monobutyl ether glycol ether, and other carbitols; and nonionic surfactants.

The humectant can be any of a wide range of compounds that suppress the evaporation of water, keep the ink wet, and improve its discharge stability. Examples include ethylene glycol, propylene glycol, diethylene glycol, triethylene glycol, polyethylene glycol, polypropylene glycol, glycerol, diglycerol, 1,3-propanediol, 1,5-pentanediol, and other polyhydric alcohols; maltitol, maltose, sorbitol, and other sugars; trimethylolethane, trimethylolpropane, and other glycerol derivatives; ethylene carbonate and other carbonic esters; imidazole, 2-methylimidazole, and other imidazole derivatives; 2-pyridinol, 3-pyridinol, and other pyridinol derivatives; and urea.

If needed, the ink composition of the present invention can further contain any auxiliaries commonly used in ink jet recording inks. Examples of such auxiliaries include pH regulators, chelating agents, preservatives, and rust inhibitors.

The above constitution prevents the dimerization and quinonization of the phenol derivative, so the resulting printed matter has excellent light resistance and clogging resistance, as well as excellent yellowing resistance.

A compound expressed by General Formula 1, whose weight reduction after 1 hour at 60° C. is no more than 1%, will act effectively in the present invention when applied as an imparting liquid over the recording medium, either separately from the ink composition or by being added thereto.

Also, in the present invention, a compound expressed by General Formula 1, whose weight reduction after 1 hour at 60° C. is no more than 1%, and a hydrazide compound, a tertiary amine compound, or a specific inorganic salt will act effectively in the present invention when applied as an imparting liquid over the recording medium, either separately from the ink composition or by being added thereto.

In this case, the imparting liquid can be produced from the same components as the above-mentioned ink composition, except for the colorant.

Recording Medium

Preferred embodiments of the recording medium pertaining to the present invention will now be described.

An ink receiving layer comprising at least an ink absorbent pigment, an ink fixing agent, and a binder is known to allow the high-quality reproduction of color images, photographic images, and so on, and the ink receiving layer of the recording medium pertaining to the embodiments of the present invention contains a compound expressed by General Formula 1, whose weight reduction after 1 hour at 60° C. is no more than 1%.

It is preferable for the compound expressed by General Formula 1 to be the same as that used in the above-mentioned ink composition.

The compound expressed by General Formula 1 is preferably contained in an amount of at least 0.01 wt % and no more than 10 wt % with respect to the total dry weight of the ink receiving layer, with at least 0.1 wt % and no more than 5 wt % being particularly favorable.

One or more types of known white pigment can be used as the ink absorbent pigment, examples of which include synthetic amorphous silica, colloidal silica, and other types of silica, and colloidal alumina.

Other examples of white pigments besides silica and alumina include light calcium carbonate, heavy calcium carbonate, magnesium carbonate, kaolin, talc, calcium sulfate, barium sulfate, titanium dioxide, zinc oxide, zinc sulfide, zinc carbonate, titanium white, aluminum silicate, diatomaceous earth, calcium silicate, magnesium silicate, pseudo-boehmite, aluminum hydroxide, magnesium hydroxide, lithopone, zeolite, hydrated halloysite, and other such white inorganic pigments, and styrene-based plastic pigments, acrylic-based plastic pigments, polyethylene, melamine resin, urea resin, and other such organic pigments.

These ink absorbent pigments are preferably contained in an amount of at least 30 wt % and no more than 90 wt % with respect to the total dry weight of the ink receiving layer, with a range of at least 40 wt % and no more than 80 wt % being particularly favorable.

A cationic compound is particularly favorable as the ink fixing agent, examples of which include low-molecular weight compounds having primary to tertiary amine or quaternary ammonium bases, oligomers having these groups, and polymers having these groups. Specific examples include diallyl dimethyl ammonium chloride polymers, diallyl dimethyl ammonium chloride-sulfur dioxide copolymers, diallyl dimethyl ammonium chloride-acrylamide copolymers, and other such diallyl dimethyl ammonium salt polymers, diallylamine hydrochloride-sulfur dioxide copolymers, diallylmethylamine hydrochloride copolymers, polyallylamines, polyethyleneimines, polyethyleneimine quaternary ammonium salt compounds, (meth) acrylic acid alkyl ammonium salt polymers, (meth) acrylamide alkyl ammonium salt polymers, ionenes containing quaternary ammonium salts, and polyalkyleneamine dicyandiamide ammonium salt condensates.

These ink fixing agents are preferably contained in an amount of at least 1 wt % and no more than 30 wt % with respect to the total dry weight of the ink receiving layer, with a range of at least 5 wt % and no more than 10 wt % being particularly favorable.

Examples of binders include oxidized starch, etherified starch, phosphoric esterified starch, and other starch derivatives, carboxylmethyl cellulose, hydroxyethyl cellulose, and other cellulose derivatives, casein, gelatin, soy protein, polyvinyl alcohol and derivatives thereof, polyvinylpyrrolidone, maleic anhydride resin, styrene-butadiene copolymers, methyl methacrylate-butadiene copolymers, and other conjugated diene-based copolymer latexes, acrylic ester and methacrylic ester copolymers or acrylic polymers, and other acrylic polymer latexes, ethylene-vinyl acetate copolymers and other vinyl polymer latexes, functional group modified polymer latexes comprising carboxyl group and other such functional group-containing monomers of these various polymers, melamine resins, urea resins, and other thermosetting resins, and other such water-based adhesive agents, polymethyl methacrylate and other acrylic ester and methacrylic ester polymers and copolymers, polyurethane resins, unsaturated polyester resin, vinyl chloride-vinyl acetate copolymers, polyvinyl butyral, alkyd resins, and other such synthetic resin-based adhesive agents.

These binders are preferably contained in an amount of at least 10 wt % and no more than 60 wt % with respect to the total dry weight of the ink receiving layer, with a range of at least 20 wt % and no more than 50 wt % being particularly favorable.

If needed, the ink receiving layer may also contain various known additives, such as dye fixing agents (water resistance agents), fluorescent whiteners, surfactants, anti-foaming agents, pH regulators, mildewproofing agents, UV absorbents, and antioxidants.

The structure of the ink receiving layer was described above, but it is particularly favorable for the percentage of void of the ink receiving layer to be set to between 30% and 80% by using silica or alumina as the main structural component of the ink receiving layer and adjusting the particle diameter of this silica or alumina, the amounts in which the other structural components are contained, and so forth. If the percentage of void is at least 30%, the recording medium will have particularly good ink absorbency, and keeping this percentage to 80% or lower ensures that the ink receiving layer will have sufficient strength.

A sheet of paper or plastic is used as the substrate, which can be either translucent or opaque.

A conventional substrate can be used, and specific examples of paper include paper composed of wood-pulp or non-wood-pulp raw material whose main component is natural cellulose fiber, while examples of plastic materials include polyester resins, diacetate resins, triacetate resins, acrylic resins, polycarbonate resins, polyvinyl chloride resins, polyimide resins, cellophane, and celluloid.

The recording medium of the present invention can be favorably obtained by coating the above-mentioned substrate with a coating solution in which the above-mentioned structural components have been dissolved or dispersed in water or another suitable solvent, by roll coating, spray coating, rod bar coating, air knife coating, or another known coating method, and then drying this coating. A standard dryer can be used to dry the coating, and this drying is usually performed between 100 and 150° C.

The above constitution gives printed matter with excellent image stability and light resistance, as well as excellent yellowing resistance.

The ink receiving layer of the recording medium pertaining to another embodiment of the present invention contains a compound expressed by the following General Formula 1, whose weight reduction after 1 hour at 60° C. is no more than 1%, and a hydrazide compound, tertiary amine compound, or specific inorganic salt.

The compound expressed by General Formula 1, the hydrazide compound, the tertiary amine compound, and the inorganic salt are preferably the same as those used for the above-mentioned ink composition.

The compound expressed by General Formula 1 is preferably contained in an amount of at least 0.01 wt % and no more than 10 wt % with respect to the total dry weight of the ink receiving layer, with a range of at least 0.1 wt % and no more than 5 wt % being particularly favorable.

The hydrazide compound, tertiary amine compound, and inorganic salt are preferably contained in an amount of at least 0.01 wt % and no more than 10 wt % with respect to the total dry weight of the ink receiving layer, with a range of at least 0.1 wt % and no more than 5 wt % being particularly favorable. Adjusting to the preferred range markedly improves the yellowing resistance of the printed matter.

In the present invention, it is preferable if the compound expressed by General Formula 1 and the hydrazide compound, tertiary amine compound, or inorganic salt are present in a weight ratio (former/latter) of at least 1:25 and no more than 5:1, with at least 1:5 and no more than 3:1 being particularly favorable. Adjusting to the preferred weight ratio markedly improves the yellowing resistance of the printed matter.

The ink absorbent pigment, the ink absorbent pigment content, the ink fixing agent, the ink fixing agent content, the binder, the binder content, the additives, and other structural features of the ink receiving layer, and the method for manufacturing the recording medium and the substrate are preferably the same as described above.

Recording Method

The ink jet recording method of the present invention will now be described.

The ink jet recording method of the present invention allows printed matter with excellent light resistance and excellent yellowing resistance to be obtained by performing ink jet recording using the above-mentioned ink composition and/or recording medium.

Furthermore, with the ink jet recording method of the present invention, printed matter with sufficient light resistance and excellent yellowing resistance can be obtained when the ink composition contains a colorant, water, and a compound expressed by the following General Formula 1, whose weight reduction after 1 hour at 60° C. is no more than 1%, and when the recording medium contains a hydrazide compound, a tertiary amine compound, or a specific inorganic salt.

EXAMPLES

The present invention will now be described in more specific terms through examples, but is not limited in any way by these examples.

Examples 1 to 6

Preparation of Ink Composition

The various component combinations shown in Table 1 were stirred for 30 minutes at normal temperature, after which each mixture was passed through a 1 μm membrane filter to obtain various ink compositions.

Measurement of Weight Reduction

The weight reduction in the compound expressed by General Formula 1 was measured by the following method for each of the ink compositions shown in Table 1.

Method for measuring weight reduction: Using a thermobalance is a standard and simple way of measuring weight reduction. Nitrogen or dry air was used for the atmosphere during the use of the thermobalance. The temperature was steadily raised from room temperature, and held for 1 hour at 60° C. The heating rate is generally 1 to 10° C. per minute, and in these examples the measurements were made under a dry air environment and at a heating rate of 5° C. per minute.

TABLE 1

| Ink composition No. | 1 | 2 | 3 | 4 | 5 | 6 |
|---|---|---|---|---|---|---|
| Colorant | | | | | | |
| C.I. Direct Red 249 | 3 | | | 2 | | |
| C.I. Direct Yellow 132 | | 4 | | | 4 | |
| C.I. Direct Yellow 86 | | | 2.5 | | | 2.5 |
| Compound expressed by General Formula 1 | | | | | | |
| Form. 1-1 compound (weight red.: −0.2%) | 0.5 | | | 7 | | |
| Form. 1-2 compound (weight red.: −0.2%) | | 0.1 | 5 | | | |
| [compound 7] compnd. (weight red.: −1.2%) | | | | | 0.1 | |
| Penetrant, etc. | | | | | | |
| glycerol | 10 | | | 3 | | |
| triethylene glycol | 5 | 25 | | | 25 | |
| 1,5-pentanediol | | 3 | 5 | | 3 | 5 |
| ethylene glycol | | | 15 | 20 | | 15 |
| Olfine E1010 (Nissin Chemical Industry Co., Ltd.) | 1 | 2 | | | 2 | |

TABLE 1-continued

| Ink composition No. | 1 | 2 | 3 | 4 | 5 | 6 |
|---|---|---|---|---|---|---|
| Olfine STG (Nissin Chemical Industry Co., Ltd.) | | | 1 | 1 | | 1 |
| diethylene glycol monobutyl ether | 10 | | | | | |
| triethylene glycol monobutyl ether | | 8 | | 10 | 8 | |
| propylene glycol monomethyl ether | | | 5 | | | 5 |
| Preservative | | | | | | |
| Proxel XL-2 (Avecia) | 0.3 | 0.3 | 0.3 | 0.3 | 0.3 | 0.3 |
| Water | bal. | bal. | bal. | bal. | bal. | bal. |

Light Resistance Test

Each of the above ink compositions was put into a special cartridge for an ink jet printer (PM800C, made by Seiko Epson) and printed onto a special ink jet recording medium (Premium Glossy Photo Paper, made by Seiko Epson). This product was left for one day at normal temperature and humidity away from direct light, after which the light resistance of the printed matter was evaluated under the following conditions.

First, optical irradiation was performed using a xenon weatherometer (Ci5000, made by Atlas), with the printed matter being exposed with a black panel at 35° C., a relative humidity of 60%, and a 340 nm UV light emission of 0.18 W/m$^2$. The irradiation conditions comprised either 180 kJ/m$^2$ (278 hours of optical irradiation under the above conditions) or 360 kJ/m$^2$ (556 hours of optical irradiation under the above conditions).

After irradiation, the reflection intensity of the various color components of the printed matter was measured using a spectrophotometer (Gretag SPM, made by Gretag). The conditions here comprised a D50 light source, no light source filter, a white standard of absolute white, and a field angle of 2°. Intensity retention was evaluated from the following criteria.

A: at least 90% of the initial value

B: at least 80% but less than 90% of the initial value

C: less than 80% of the initial value

Clogging Test

An ink cartridge filled with ink composition was installed in the above-mentioned printer, and after it was confirmed that the ink composition was initially discharging normally, the power was shut off to the printer, and the ink cartridge was left installed for a period of one to 12 months at a temperature of 40° C. and a relative humidity of 20%. After the specified time had elapsed, the printer was moved to a normal temperature environment, and after the housing temperature had dropped to normal temperature, the power was turned back on and printing was performed again, and the number of resets that had to be performed until the same quality was obtained as before the test was counted. The evaluation was made according to the following criteria.

A: The same print quality as at the outset was obtained with zero to two resets.

B: The same print quality as at the outset was obtained with three to five resets.

C: The same print quality as at the outset was not obtained with six or more resets.

Yellowing Resistance Test

[A special ink jet recording medium] (Premium Glossy Photo Paper, made by Seiko Epson) was printed by the same method as in the light resistance test.

The printed matter thus obtained was then put into a clear plastic folder (CL-A420, made by Mitsubishi Pencil) and stored for a period of three days to one month at a temperature of 40° C. and a relative humidity of 20%. After the specified time had elapsed, the printed matter was taken out of its plastic folder and visually checked according to the following criteria for discoloration in the non-printed portions and for color change in the printed portions and the surrounding areas.

A: No yellowing whatsoever; good.

B: Very slight yellowing noted, but not enough to pose a problem in terms of image quality.

C: The printed portions and their surroundings had yellowed.

Results of Print Evaluation Test

Table 2 gives the results of the various tests conducted using the above-mentioned ink compositions 1 to 6.

TABLE 2

| Ink composition No. Example/ Comparative Example No. | | 1 Ex. 1 | 2 Ex. 2 | 3 Ex. 3 | 4 Ex. 4 | 5 CE 1 | 6 CE 2 |
|---|---|---|---|---|---|---|---|
| Light resistance test | 180 kJ/m$^2$ | A | A | A | A | A | C |
| | 360 kJ/m$^2$ | A | B | A | A | B | C |
| Clogging test (40° C., 20% RH) | 1 month | A | A | A | A | A | A |
| | 3 months | A | B | A | A | B | A |
| | 6 months | A | B | B | A | B | B |
| | 12 months | A | B | B | B | B | B |
| Folder yellowing test (40° C., 20% RH) | 3 days | A | A | A | A | A | A |
| | 7 days | A | A | A | A | B | A |
| | 14 days | A | A | B | B | B | A |
| | 28 days | B | A | B | B | C | A |

As is clear from Table 2, in Examples 1 to 4, which featured the use of an ink composition containing a compound expressed by General Formula 1, whose weight reduction after 1 hour at 60° C. was no more than 1 wt %, the results were all satisfactory for light resistance, clogging resistance, and folder yellowing resistance, whereas Comparative Examples 1 and 2 were unsatisfactory in all of these categories.

Production of Recording Medium

Wood-free paper with a basis weight of 100 g/m$^2$ was used as a substrate, and this substrate was coated with a coating solution comprising a mixture of water and the ink receiving layer components listed in Table 3 ({weight of ink receiving layer components}:{weight of water}=20:80) in an amount of 15 g/m$^2$. This was followed by drying for 2 minutes at 130° C. using a dryer, which produced recording media A to D.

TABLE 3

| Recording medium | | A | B | C | D |
|---|---|---|---|---|---|
| Compound of General Formula 1 | Form. 1-1 compound (weight reduction: −0.2%) | 0.5 | | | |
| | Form. 1-2 compound (weight reduction: −0.2%) | | 4 | | |
| | [compound 7] compound (weight reduction: −1.2%) | | | 0.5 | |
| Ink absorbent pigment | Silica Gel P78D (made by Mizusawa Chemical Industries) | | | 60 | |
| Ink fixing agent | diallyl methyl ammonium chloride-sulfur dioxide copolymer, PAS-A (made by Nitto Boseki) | | | 9 | |
| Binder | polyvinyl alcohol, CM318 (degree of polymerization: 1800; made by Kuraray) | | | balance | |

units: wt %

Results of Print Evaluation Test

The above-mentioned ink compositions and recording media were variously combined as shown in Table 4, printing was performed, and a light resistance test and yellowing resistance test were conducted by the same methods as above. The results of these tests are given in Table 4.

TABLE 4

| Ink composition No. | | 6 | | | |
|---|---|---|---|---|---|
| Recording medium | | A | B | C | D |
| Example/ Comparative Example No. | | Ex. 5 | Ex. 6 | C.E. 3 | C.E. 4 |
| Light resistance test | 180 kJ/m$^2$ | A | A | A | C |
| | 360 kJ/m$^2$ | B | A | B | C |
| Folder yellowing test | 3 days | A | A | A | A |
| | 7 days | A | A | B | A |
| | 14 days | A | A | B | A |
| | 28 days | A | B | C | A |

As is clear from Table 4, in Examples 5 and 6, in which either the ink composition or the recording medium contained a compound expressed by General Formula 1, whose weight reduction after 1 hour at 60° C. was no more than 1 wt %, the results were all satisfactory for light resistance, clogging resistance, and folder yellowing resistance, whereas Comparative Examples 3 and 4 were unsatisfactory in all of these categories.

Examples 7 to 33

Preparation of Ink Composition

The various components shown in Tables 5 and 6 were stirred for 30 minutes at normal temperature, after which the system was passed through a 1 μm membrane filter to obtain various ink compositions.

Measurement of Weight Reduction

The weight reduction in the compound expressed by General Formula 1 was measured by the following method for each of the ink compositions shown in Tables 5 and 6.

Method for measuring weight reduction: Using a thermobalance is a standard and simple way of measuring weight reduction. Nitrogen or dry air was used for the atmosphere during the use of the thermobalance. The temperature was steadily raised from room temperature, and held for 1 hour at 60° C. The heating rate is generally 1 to 10° C. per minute, and in these examples the measurements were made under a dry air environment and at a heating rate of 5° C. per minute.

TABLE 5

| Ink composition No. | | | 1 | 2 | 3 | 4 | 5 | 6 | 7 | 8 | 9 | 10 | 11 | 12 |
|---|---|---|---|---|---|---|---|---|---|---|---|---|---|---|
| Colorant | | C.I. Direct Red 249 | | | | 2 | | 3 | | | | 3 | | |
| | | C.I. Direct Yellow 132 | | 4 | | | 3 | | 4 | | | | 4 | |
| | | C.I. Direct Yellow 86 | | 2.5 | | | | | | | 2.5 | | | 2.5 |
| Compound expressed by General Formula 1 | | Form. 1-1 compound (weight red.: −0.2%) | 0.5 | 0.1 | | | | 0.5 | 0.1 | | | 0.5 | 0.1 | |
| | | Form. 1-2 compound (weight red.: −0.2%) | | | 0.4 | 8 | 4 | | | | | | | 0.4 |
| | | [compound 10] compnd. (weight red.: −1.2%) | | | | | | | | | | | | |
| Additiv | Hydrazide compounds | Form. 3-3 compound | 2 | | | | 10 | | | | | | | |
| | | Form. 3-4 compound | | 2 | | | | | | | | | | |
| | | Form. 3-11 compound | | | 0.1 | | | | | | 0.1 | | | |
| | | Form. 3-13 compound | | | | 4 | | | | | | | | |
| | Tertiary amine compounds | 1,4-diazabicyclo[2.2.2] octane (DABCO) | | | | | | | | | | 2 | 1 | 0.1 |
| | | hexamethylene tetramine (HMTA) | | | | | | | | | | | 1 | |
| | In or | potassium sulfite ($K_2SO_3$) | | | | | | | | | | | | |
| | | lithium thiosulfate ($Li_2S_2O_3$) | | | | | | | | | | | | |
| | | potassium hypophosphite ($KPH_2O_2$) | | | | | | | | | | | | |
| | | sodium phosphite ($Na_2PHO_3$) | | | | | | | | | | | | |
| Penetrant, etc. | | glycerol | 13 | | | 2 | 8 | 13 | | 13 | | 12 | | |
| | | triethylene glycol | | 30 | | 10 | 2 | | 30 | | | | 26 | |
| | | 1,5-pentanediol | | | 4 | | | | | | 4 | | | 5 |
| | | ethylene glycol | | | 14 | | | | | | 14 | | | 13 |
| | | Olfine E1010 (Nissin Chemical Industry Co., Ltd.) | 1 | 2 | | | 1 | 1 | 2 | 1 | | 1 | | 2 |
| | | Olfine STG (Nissin Chemical Industry Co., Ltd.) | | | 1 | 0.5 | | | | | 1 | | 1 | |
| | | diethylene glycol monobutyl ether | 10 | | | | 9 | 10 | | 10 | | | 9 | |
| | | triethylene glycol monobutyl ether | | 8 | | 10 | | | 8 | | | 10 | | |
| | | propylene glycol mononothyl ether | | | 5 | | | | | | 5 | | | 5 |

TABLE 5-continued

| Ink composition No. | | 1 | 2 | 3 | 4 | 5 | 6 | 7 | 8 | 9 | 10 | 11 | 12 |
|---|---|---|---|---|---|---|---|---|---|---|---|---|---|
| Preservative | Proxel XL-2 (Avecia) | 0.3 | 0.3 | 0.3 | 0.3 | 0.3 | 0.3 | 0.3 | 0.3 | 0.3 | 0.3 | 0.3 | 0.3 |
| Water | | B | B | B | B | B | B | B | B | B | B | B | B |

units: wt %
[HC: hydrazide compound]
[TAC: tertiary amine compound]
[IS: inorganic salt]
[B: Balance]

TABLE 6

| Ink composition No. | | | 13 | 14 | 15 | 16 | 17 | 18 | 19 | 20 | 21 | 22 | 23 | 24 |
|---|---|---|---|---|---|---|---|---|---|---|---|---|---|---|
| Colorant | | C.I. Direct Red 249 | 2 | | | 3 | | | 2 | | | | | 3 |
| | | C.I. Direct Yellow 132 | | 3 | | | 4 | | | 3 | | 4 | 4 | |
| | | C.I. Direct Yellow 86 | | | 2.5 | | | 2.5 | | | 2.5 | | | |
| Compound expressed by General Formula 1 | | Form. 1-1 compound (weight red.: −0.2%) | | | | 0.5 | 0.1 | | | | | | | 0.5 |
| | | Form. 1-2 compound (weight red.: −0.2%) | 8 | 4 | | | | 0.4 | 8 | 4 | | | | |
| | | [compound 10] compnd. (weight red.: −1.2%) | | | | | | | | | | 0.1 | 0.1 | |
| Additiv | Hydrazide compounds | Form. 3-3 compound | | | | | | | | | | | 2 | 1 |
| | | Form. 3-4 compound | | | | | | | | | | | | |
| | | Form. 3-11 compound | | | | | | | | | | | | |
| | | Form. 3-13 compound | | | | | | | | | | | | |
| | Tertiary amine compounds | 1,4-diazabicyclo[2.2.2]octane (DABCO) | | 10 | 0.1 | | | | | | | | | |
| | | hexamethylene tetramine (HMTA) | 4 | | | | | | | | | | | |
| | Inorganic | potassium sulfite ($K_2SO_3$) | | | | | 2 | | | | | | | |
| | | lithium thiosulfate ($Li_2S_2O_3$) | | | | 2 | | 0.1 | | | 0.1 | | | 1 |
| | | potassium hypophosphite ($KPH_2O_2$) | | | | | | | 4 | | | | | |
| | | sodium phosphite ($Na_2PHO_3$) | | | | | | | | 10 | | | | |
| Penetrant, etc. | | glycerol | 5 | 2 | | 12 | | 5 | | 2 | 5 | | | 12 |
| | | triethylene glycol | | 10 | | | 26 | | | 10 | | 25 | 30 | |
| | | 1,5-pentanediol | | | 5 | | | | 6 | | | 3 | | |
| | | ethylene glycol | 8 | | 13 | | | 13 | 7 | | 13 | | | |
| | | Olfine E1010 (Nissin Chemical) | 0.5 | | 2 | 1 | 0.5 | 2 | | | 2 | 2 | 2 | 1 |
| | | Olfine STG (Nissin Chemical) | | 2 | | | | | 2 | 1.5 | | | | |
| | | diethylene glycol monobutyl ether | 10 | | | | 10 | | 9 | | | | | 10 |
| | | triethylene glycol monobutyl ether | | 10 | | 10 | | | | 10 | | 8 | 8 | |
| | | propylene glycol mononothyl ether | | | 5 | | | 6 | | | 6 | | | |
| Preservative | | Proxel XL-2 (Avecia) | 0.3 | 0.3 | 0.3 | 0.3 | 0.3 | 0.3 | 0.3 | 0.3 | 0.3 | 0.3 | 0.3 | 0.3 |
| Water | | | B | B | B | B | B | B | B | B | B | B | B | B |

units: wt %

Light Resistance Test

Each of the above ink compositions was put into a special cartridge for an ink jet printer (PM800C, made by Seiko Epson) and printed onto a special ink jet recording medium (PM photographic paper, made by Seiko Epson). This product was left for one day at normal temperature and humidity away from direct light, after which the light resistance of the printed matter was evaluated under the following conditions.

First, optical irradiation was performed using a xenon weatherometer (Ci5000, made by Atlas), with the printed matter being exposed with a black panel at 35° C., a relative humidity of 60%, and a 340 nm UV light emission of 0.18 $W/m^2$. The irradiation conditions comprised either 180 $kJ/m^2$ (278 hours of optical irradiation under the above conditions) or 360 $kJ/m^2$ (556 hours of optical irradiation under the above conditions).

After irradiation, the reflection intensity of the various color components of the printed matter was measured using a spectrophotometer (Gretag SPM, made by Gretag). The conditions here comprised a D50 light source, no light source filter, a white standard of absolute white, and a field angle of 2°. Intensity retention was evaluated from the following criteria.

A: at least 90% of the initial value

B: at least 80% but less than 90% of the initial value

C: less than 80% of the initial value

Clogging Test

An ink cartridge filled with ink composition was installed in the above-mentioned printer, and after it was confirmed that the ink composition was initially discharging normally, the power was shut off to the printer, and the ink cartridge was left installed for a period of one to 12 months at a temperature of 40° C. and a relative humidity of 20%. After the specified time had elapsed, the printer was moved to a normal temperature environment, and after the housing temperature had dropped to normal temperature, the power was turned back on and printing was performed again, and the number of resets that had to be performed until the same quality was obtained as before the test was counted. The evaluation was made according to the following criteria.

A: The same print quality as at the outset was obtained with zero to two resets.

B: The same print quality as at the outset was obtained with three to five resets.

C: The same print quality as at the outset was not obtained with six or more resets.

Yellowing Resistance Test

A special ink jet recording medium (Premium Glossy Photo Paper, made by Seiko Epson) was printed by the same method as in the light resistance test.

The printed matter thus obtained was then put into a clear plastic file (CL-A420, made by Mitsubishi Pencil) and stored for a period of three days to one month at a temperature of 60° C. and a relative humidity of 20%. After the specified time had elapsed, the printed matter was taken out of its plastic folder and visually checked according to the following criteria for color change in the non-printed portions and for discoloration in the printed portions and the surrounding areas.

A: No yellowing whatsoever; good.

B: Very slight yellowing noted, but not enough to pose a problem in terms of image quality.

C: The printed portions and their surroundings had yellowed.

Results of Print Evaluation Test

Tables 7 and 8 give the results of the various tests conducted using the above-mentioned ink compositions 1 to 24.

TABLE 7

| Ink composition No. | | 1 | 2 | 3 | 4 | 5 | 6 | 7 | 8 | 9 | 10 | 11 | 12 |
|---|---|---|---|---|---|---|---|---|---|---|---|---|---|
| Example/Comparative Example No. | | Ex 7 | Ex 8 | Ex 9 | Ex 10 | Ex 11 | CE 5 | CE 6 | CE 7 | CE 8 | Ex 12 | Ex 13 | Ex 14 |
| Ratio of compound of General Formula 1 and additive | | 1:4 | 1:20 | 4:1 | 2:1 | 1:2.5 | — | — | — | — | 1:4 | 1:20 | 4:1 |
| Light resistance test | 180 kJ/m$^2$ | A | A | A | A | A | A | A | C | C | A | A | A |
| | 360 kJ/m$^2$ | A | B | B | A | A | A | B | C | C | A | B | B |
| Clogging resistance test (40° C., 20% RH) | one month | A | A | A | A | A | A | A | A | A | A | A | A |
| | three months | A | B | A | A | A | A | B | A | A | A | B | A |
| | six months | A | B | B | B | A | A | B | A | B | A | B | B |
| | 12 months | A | B | B | B | B | A | B | A | B | A | B | B |
| Folder yellowing test (60° C., 20% RH) | three days | A | A | B | A | A | A | A | A | A | A | A | B |
| | seven days | A | A | B | B | A | B | B | A | A | B | B | B |
| | 14 days | B | A | B | B | B | C | B | A | A | B | B | B |
| | 28 days | B | B | B | B | B | C | C | A | A | B | B | B |

[Ex: Example, CE: Comparative Example]

TABLE 8

| Ink composition No. | | 13 | 14 | 15 | 16 | 17 | 18 | 19 | 20 | 21 | 22 | 23 | 24 |
|---|---|---|---|---|---|---|---|---|---|---|---|---|---|
| Example/Comparative Example No. | | Ex 15 | Ex 16 | CE 9 | Ex 17 | Ex 18 | Ex 19 | Ex 20 | Ex 21 | CE 10 | CE 11 | CE 12 | Ex 22 |
| Ratio of compound of General Formula 1 and additive | | 2:1 | 1:2.5 | — | 1:4 | 1:20 | 4:1 | 2:1 | 1:2.5 | — | — | 1:20 | 1:4 |
| Light resistance test | 180 kJ/m$^2$ | A | A | C | A | A | A | A | A | C | A | A | A |
| | 360 kJ/m$^2$ | A | A | C | A | B | B | A | A | C | B | B | A |
| Clogging resistance test (40° C., 20% RH) | one month | A | A | A | A | A | A | A | A | A | A | A | A |
| | three months | A | A | A | A | A | A | A | A | A | B | B | A |
| | six months | B | A | B | A | A | B | B | A | B | B | B | A |
| | 12 months | B | B | B | A | B | B | B | B | B | B | B | A |
| Folder yellowing test (60° C., 20% PH) | three days | B | A | A | A | A | B | A | A | A | B | A | A |
| | seven days | B | B | A | A | A | B | B | A | A | C | B | A |
| | 14 days | B | B | A | B | B | B | B | B | A | C | C | B |
| | 28 days | B | B | A | B | B | B | B | B | A | C | C | B |

As is clear from Tables 7 and 8, light resistance, clogging resistance, and folder yellowing resistance could not all be satisfied with Comparative Examples 5 to 12, whereas the results were satisfactory for all of these with Examples 7 to 22.

Production of Recording Medium

Wood-free paper with a basis weight of 100 g/m$^2$ was used as a substrate, and this substrate was coated with a coating solution comprising a mixture of water and the ink receiving layer components listed in Table 9 ({weight of ink receiving layer components}:{weight of water}=20:80) in an amount of 15 g/m$^2$. This was followed by drying[8] for 2 minutes at 130° C. using a dryer, which produced recording media A to P.

TABLE 9

| Recording medium | A | B | C | D | E | F | G | H | I | J | K | L | M | N | O | P |
|---|---|---|---|---|---|---|---|---|---|---|---|---|---|---|---|---|
| Compound of General Formula 1 | | | | | | | | | | | | | | | | |
| Form. 1-1 compound (weight reduction: −0.2%) | 0.5 | 4 | | | | 0.5 | 4 | | | | | | | 0.5 | | 4 |
| Form. 1-2 compound (weight reduction: −0.2%) | | | | | | | | | | 0.5 | 4 | | | | | |
| [compound 7] compound (weight reduction: −1.2%) | | | | | | | | | | | | | | | 0.5 | |
| Hydrazine Compounds | | | | | | | | | | | | | | | | |
| Form. 3-4 compound | 0.5 | 4 | 1 | 4 | | | | | | | | | | | | 4 |
| Tertiary Amine Compounds | | | | | | | | | | | | | | | | |
| 1,4-diazabicyclo[2.2.2]octane (DABCO) | | | | | | 0.5 | | 0.5 | | | | | | | | |
| hexamethylene tetramine (HMTA) | | | | | | | 4 | | 4 | | | | | | | |
| Inorganic Salts | | | | | | | | | | | | | | | | |
| sodium phosphite ($Na_2PHO_3$) | | | | | | | | | | 0.5 | | 0.5 | | | | 4 |
| potassium hypophosphite ($KPH_2O_2$) | | | | | | | | | | | 4 | | 4 | | | |
| Ink absorbent pigment — Silica Gel P78D (trade name of Mizusawa Chemical Industries) | | | | | | | | | | | | 60 | | | | |
| Ink fixing agent — diallyl methyl ammonium chloride-sulfur dioxide copolymer, PAS-A (trade name of Nitto Boseki) | | | | | | | | | | | | 9 | | | | |
| Binder — polyvinyl alcohol, CM318 (degree of polymerization: 1800; trade name of Kuraray) | | | | | | | | | | | | balance | | | | |

units: wt %

Results of Print Evaluation Test

The above-mentioned ink compositions and recording media were variously combined as shown in Tables 10 and 11, printing was performed, and a light resistance test and yellowing resistance test were conducted by the same methods as above. The results of these tests are given in Tables 10 and 11.

TABLE 10

| Ink composition No. | | 1 | | | 6 | | | 8 | | | | | |
|---|---|---|---|---|---|---|---|---|---|---|---|---|---|
| Recording medium | | A | C | E | F | H | E | B | D | E | N | O | P |
| Example/Comparative Example No. | | Ex 23 | Ex 24 | Ex 25 | Ex 26 | Ex 27 | CE 13 | Ex 28 | CE 14 | CE 15 | CE 16 | CE 17 | Ex 29 |
| Light resistance test | 180 kJ/m$^2$ | A | A | A | A | A | A | A | C | C | A | A | A |
| | 360 kJ/m$^2$ | B | B | B | B | B | B | A | C | C | B | B | A |
| Folder yellowing resistance test (60° C., 20% RH) | 3 days | A | A | A | B | A | B | A | A | A | A | B | A |
| | 7 days | A | A | A | B | B | B | A | A | A | B | C | B |
| | 14 days | A | A | A | B | B | C | B | A | A | C | C | B |
| | 28 days | B | A | A | B | B | C | B | A | A | C | C | B |

TABLE 11

| Ink composition No. | | 9 | | | 10 | | | 21 | | |
|---|---|---|---|---|---|---|---|---|---|---|
| Recording medium | | G | I | E | J | L | E | K | M | E |
| Example/Comparative | | Ex | CE | CE | Ex | Ex | CE | Ex | CE | CE |
| Example No. | | 30 | 18 | 19 | 31 | 32 | 20 | 33 | 21 | 22 |
| Light resistance test | 180 kJ/m$^2$ | A | C | C | A | A | A | A | C | C |
| | 360 kJ/m$^2$ | A | C | C | B | B | B | A | C | C |
| Folder yellowing resistance test (60° C., 20% RH) | 3 days | A | A | A | A | A | B | A | A | A |
| | 7 days | B | A | A | B | B | B | B | A | A |
| | 14 days | B | A | A | B | B | C | B | A | A |
| | 28 days | B | A | A | B | B | C | B | A | A |

As is clear from Tables 10 and 11, light resistance, clogging resistance, and folder yellowing resistance could not all be satisfied with Comparative Examples 13 to 22, whereas the results were satisfactory for all of these with Examples 23 to 33.

With the ink composition and recording medium of the present invention, and with the ink jet recording method of the present invention, it is possible to obtain a high-quality image with excellent light resistance of the printed matter, with no clogging, and with excellent yellowing resistance of the printed matter.

Furthermore, the printed matter of the present invention has excellent light resistance of the recorded images, as well as excellent yellowing resistance.

What is claimed is:

1. An ink composition comprising a colorant, water, a compound A selected from the group consisting of a hydrazide compound, a tertiary amine compound and an inorganic salt, and a first compound expressed by the following general formula

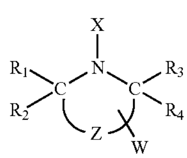

wherein W is a —$SO_2NH_2$ group, —$NHCOCH_3$ group, —$CONH_2$ group, —C═NH($NH_2$) group, —NHC═NH($NH_2$) group, —$SO_3H$ group, sulfuric ester group, —P(O)(OH)(OR), —P(O)$(OR)_2$, carbamoyl group ar salt thereof, salt of a carboxyl group, salt of an amino group, salt of a phenolic hydroxyl group, polyethylene glycol ether group, salt of —C═NH($NH_2$), or salt of —NHC═NH($NH_2$); R is an alkyl group or aryl group; X is a hydrogen, oxy radical, hydroxyl group, alkyl group, alkenyl group, alkynyl group, aryl group, acyl group, sulfonyl group, sulfinyl group, alkoxy group, aryloxy group, or acyloxy group; $R^1$, $R^2$, $R^3$, and $R^4$ are each a hydrogen or alkyl group; Z is a group of nonmetal atoms necessary to complete a five- to seven-member ring; and any two groups out of $R^1$ to $R^4$ and Z may bond together to form a five- to seven-member ring, wherein the hydrazide compound is a compound expressed by (i) the general formula $R^5CXNHNR^6R^7$, where $R^5$ is an alkyl group or aryl group; $R^6$ and $R^7$ are a hydrogen, alkyl group, or aryl group; and X is S or O, or (ii) the general formula $R^5SO_2NHNR^6R^7$, where $R^5$ is an alkyl group or aryl group; and $R^6$ and $R_7$ are a hydrogen, alkyl group, or aryl group or (iii) the general formula $R^5NHCXNHNR^6R^7$, where $R^5$ is an alkyl group or aryl group; $R^6$ and $R^7$ are a hydrogen, alkyl group, or aryl group; and X is S or O; wherein the inorganic salt is selected from the group consisting of $MS_2O_4$, $MSO_3$, $MS_2O_3$, $MPH_2O_2$, and $MPHO_3$, where M is an alkali metal or alkaline earth metal, and wherein the first compound is selected from the group consisting of (1-1)

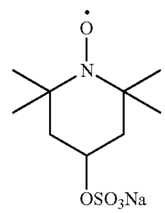

(1-2)

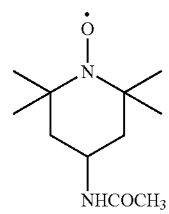

(1-3)

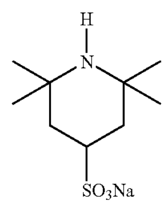

(1-4)

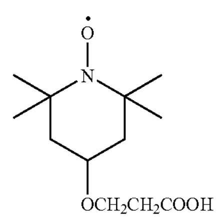

(1-5)

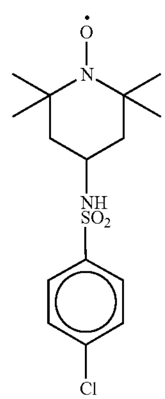

-continued (1-6)

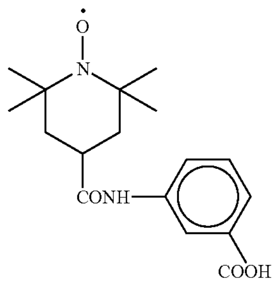

and (1-7)

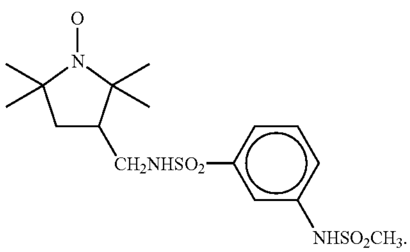

2. The ink composition according to claim 1, wherein the first compound is contained in the ink composition in an amount of at least 0.05 wt % and no more than 10 wt %.

3. The ink composition according to claim 1, further comprising a penetrant or a humectant or both.

4. The ink composition according to claim 1, wherein compound A is present in the ink composition in an amount of at least 0.01 wt % and no more than 10 wt %.

5. The ink composition according to claim 4, wherein the first compound is present in the ink composition in an amount of at least 0.05 wt % and no more than 10 wt %.

6. The ink composition according to claim 1, wherein the first compound is present in the ink composition with respect to compound A in a weight ration of at least 1:25 and no more than 5:1.

7. An ink composition comprising a colorant, water, a compound A and a first compound expressed by the following general formula

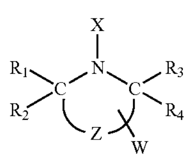

wherein W is a —$SO_2NH_2$ group, —NHCOCH, group, —$CONH_2$ group, —C═NH($NH_2$) group, —NHC═NH($NH_2$) group, —$SO_3H$ group, sulfuric ester group, —P(O)(OH)(OR), —P(O)$(OR)_2$, carbamoyl group or salt thereof, salt of a carboxyl group, salt of an amino group, salt of a phenolic hydroxyl group, polyethylene glycol ether group, salt of —C═NH($NH_2$), or salt of —NHC═NH($NH_2$); R is an alkyl group or aryl group; X is a hydrogen, oxy radical, hydroxyl group, alkyl group, alkenyl group, alkynyl group, aryl group, acyl group, sulfonyl group, sulfinyl group, alkoxy group, aryloxy group, or acyloxy group; $R^1$, $R^2$, $R^3$, and $R^4$ are each a hydrogen or alkyl group; Z is a group of nonmetal atoms necessary to complete a five- to seven-member ring; and any two groups out of $R^1$ to $R^4$ and Z may bond together to form a five- to seven-member ring, wherein the hydrazide compound is a compound expressed by (i) the general formula $R^5CXNHNR^6R^7$, where $R^5$ is an alkyl group or aryl group; $R^6$ and $R^7$ are a hydrogen, alkyl group, or aryl group; and X is S or O, or (ii) the general formula $R^5SO_2NHNR^6R^7$, where $R^5$ is an alkyl group or aryl group; and $R^6$ and $R^7$ are a hydrogen, alkyl group, or aryl group or (iii) the general formula $R^5NHCXNHNR^6R^7$, where $R^5$ is an alkyl group or aryl group; $R^6$ and $R^7$ are a hydrogen, alkyl group, or aryl group; and X is S or O; wherein the inorganic salt is selected from the group consisting of $MS_2O_4$, $MSO_3$, $MS_2O_3$, $MPH_2O_2$, and $MPHO_3$, where M is an alkali metal or alkaline earth metal, wherein the first compound is selected from the group consisting of (1-1)

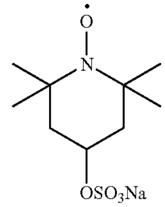

(1-2)

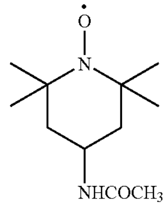

(1-3)

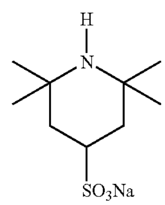

(1-4)

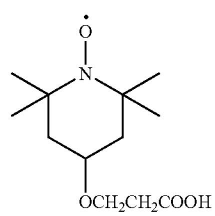

(1-5)

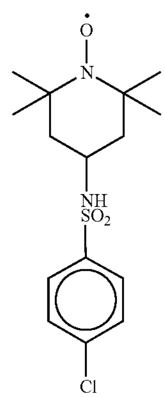

-continued (1-6)

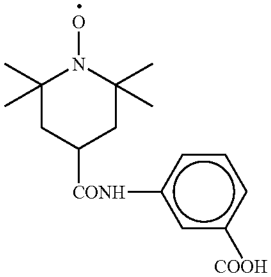

and (1-7)

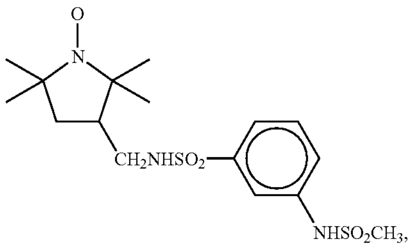

and wherein compound A comprises a hydrazide compound.

8. An ink composition comprising a colorant, water, a compound A and a first compound expressed by the following general formula

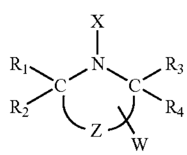

wherein W is a —$SO_2NH_2$ group, —$NHCOCH_3$ group, —$CONH_2$ group, —C═NH($NH_2$) group, —NHC═NH ($NH_2$) group, —$SO_3H$ group, sulfuric ester group, —P(O)(OH)(OR), —P(O)$(OR)_2$, carbamoyl group or salt thereof, salt of a carboxyl group, salt of an amino group, salt of a phenolic hydroxyl group, polyethylene glycol ether group, salt of —C═NH($NH_2$), or salt of —NHC═NH($NH_2$); R is an alkyl group or aryl group; X is a hydrogen, oxy radical, hydroxyl group, alkyl group, alkenyl group, alkynyl group, aryl group, acyl group, sulfonyl group, sulfinyl group, alkoxy group, aryloxy group, or acyloxy group; $R^1$, $R^2$, $R^3$, and $R^4$ are each a hydrogen or alkyl group; Z is a group of nonmetal atoms necessary to complete a five- to seven-member ring; and any two groups out of $R^1$ to $R^4$ and Z may bond together to form a five- to seven-member ring, wherein the hydrazide compound is a compound expressed by (i) the general formula $R^5CXNHNR^6R^7$, where $R^5$ is an alkyl group or aryl group; $R^6$ and $R^7$ are a hydrogen, alkyl group, or aryl group; and X is S or O, or (ii) the general formula $R^5SO_2NHNR^6R^7$, where $R^5$ is an alkyl group or aryl group; and $R^6$ and $R^7$ are a hydrogen, alkyl group, or aryl group or (iii) the general formula $R^5NHCXNHNR^6R^7$, where $R^5$ is an alkyl group or aryl group; $R^6$ and $R^7$ are a hydrogen, alkyl group, or aryl group; and X is S or O; wherein the inorganic salt is selected from the group consisting of $MS_2O_4$, $MSO_3$, $MS_2O_3$, $MPH_2O_2$, and $MPHO_3$, where M is an alkali metal or alkaline earth metal, wherein the first compound is selected from the group consisting of, (1-1)

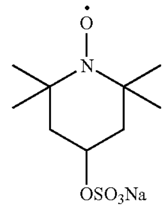

(1-2)

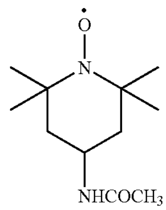

(1-3)

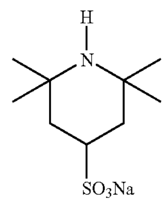

(1-4)

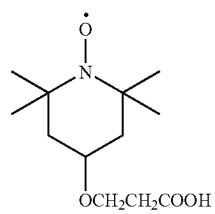

(1-5)

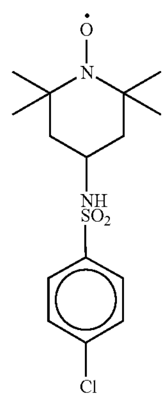

(1-6)

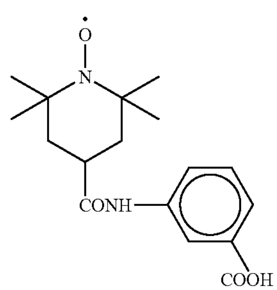

and

-continued (1-7)

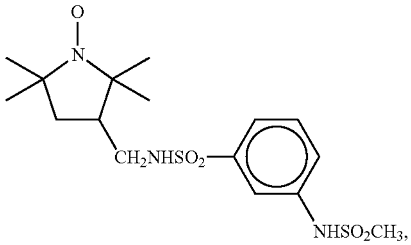

and wherein compound A comprises a tertiary amine compound, the tertiary amine being either a substitutable cyclic tertiary amine or 1,4-diazabicyclo[2.2.2]octane and/or hexamethylenetetramine.

9. An ink composition comprising a colorant, water, a compound A and a first compound expressed by the following general formula

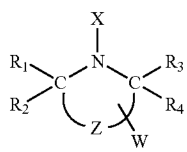

wherein W is a —$SO_2NH_2$group, —$NHCOCH_3$ group, —$CONH_2$ group, —C═NH($NH_2$) group, —NHC═NH($NH_2$) group, —$SO_3H$ group, sulfuric ester group, —P(O)(OH)(OR), —P(O)$(OR)_2$, carbamoyl group or salt thereof, salt of a carboxyl group, salt of an amino group, salt of a phenolic hydroxyl group, polyethylene glycol ether group, salt of —C═NH($NH_2$), or salt of —NHC═NH($NH_2$); R is an alkyl group or aryl group; X is a hydrogen, oxy radical, hydroxyl group, alkyl group, alkenyl group, alkynyl group, aryl group, acyl group, sulfonyl group, sulfinyl group, alkoxy group, aryloxy group, or acyloxy group; $R^1$, $R^2$, $R^3$, and $R^4$ are each a hydrogen or alkyl group; Z is a group of nonmetal atoms necessary to complete a five- to seven-member ring; and any two groups out of $R^1$ to $R^4$ and Z may bond together to form a five- to seven-member ring, wherein the hydrazide compound is a compound expressed by (i) the general formula $R^5CXNHNR^6R^7$, where $R^5$ is an alkyl group or aryl group; $R^6$ and $R^7$ are a hydrogen, alkyl group, or aryl group; and X is S or O, or (iii the general formula $R^5SO_2NHNR^6R^7$, where $R^5$ is an alkyl group or aryl group; and $R^6$ and $R^7$ are a hydrogen, alkyl group, or aryl group or (iii) the general formula $R^5NHCXNHNR^6R^7$, where $R^5$ is an alkyl group or aryl group; $R^6$ and $R^7$ are a hydrogen, alkyl group, or aryl group; and X is S or O; wherein the inorganic salt is selected from the group consisting of $MS_2O_4$, $MSO_3$, $MS_2O_3$, $MPH_2O_2$, and $MPHO_3$, where M is an alkali metal or alkaline earth metal, wherein the first compound is selected from the group consisting of, (1-1)

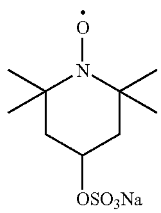

-continued (1-2)

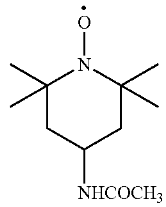

(1-3)

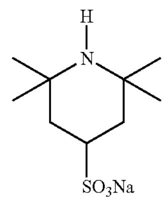

(1-4)

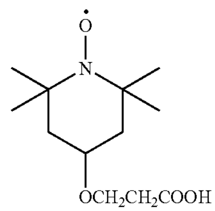

(1-5)

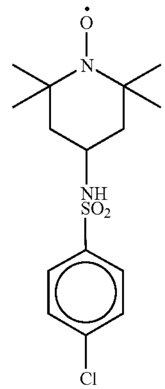

(1-6)

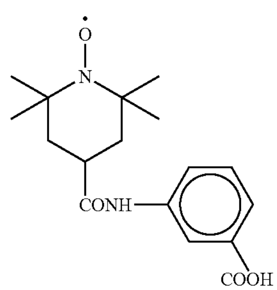

and (1-7)

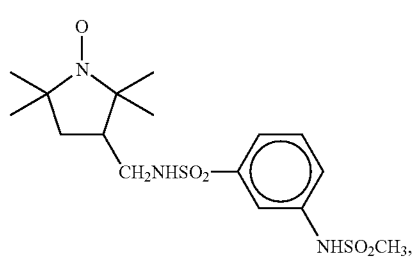

and wherein compound A comprises an inorganic salt.

10. The ink composition according to claim 7, wherein the hydrazide compound has two or more hydrazide structures per molecule.

11. The ink composition according to claim 9, wherein the inorganic salt is a potassium salt or sodium salt.

12. A recording medium comprising an ink receiving layer provided on a substrate, wherein the ink receiving layer contains a compound A selected from the group consisting of a hydrazide compound, a tertiary amine compound and an inorganic salt, and a first compound expressed by the following general formula:

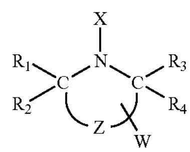

wherein W is a —$SO_2NH_2$ group, —$NHCOCH_3$ group, —$CONH_2$ group, —C═NH($NH_2$) group, —NHC═NH($NH_2$) group, —$SO_3H$ group, sulfuric ester group, —P(O)(OH)(OR), —P(O)$(OR)_2$, carbamoyl group or salt thereof, salt of a carboxyl group, salt of an amino group, salt of a phenolic hydroxyl group, polyethylene glycol ether group, salt of —C═NH($NH_2$), or salt of —NHC═NH($NH_2$); R is an alkyl group or aryl group; X is a hydrogen, oxy radical, hydroxyl group, alkyl group, alkenyl group, alkynyl group, aryl group, acyl group, sulfonyl group, sulfinyl group, alkoxy group, aryloxy group, or acyloxy group; $R^1$, $R^2$, $R^3$, and $R^4$ are each a hydrogen or alkyl group; Z is a group of nonmetal atoms necessary to complete a five- to seven-member ring; and any two groups out of $R^1$ to $R^4$ and Z may bond together to form a five- to seven-member ring, wherein the hydrazide compound is a compound expressed by (i) the general formula $R^5CXNHNR^6R^7$, where $R^5$ is an alkyl group or aryl group; $R^6$ and $R^7$ are a hydrogen, alkyl group, or aryl group; and X is S or O, or (ii) the general formula $R^5SO_2NHNR^6R^7$ where $R^5$ is an alkyl group or aryl group; and $R^6$ and $R^7$ are a hydrogen, alkyl group, or aryl group or (iii) the general formula $R^5NHCXNHNR^6R^7$, where $R^5$ is an alkyl group or aryl group; $R^6$ and $R^7$ are a hydrogen, alkyl group, or aryl group; and X is S or O; wherein the inorganic salt is selected from the group consisting of $MS_2O_4$, $MSO_3$, $MS_2O_3$, $MPH_2O_2$, and $MPHO_3$, where M is an alkali metal or alkaline earth metal.

13. The recording medium according to claim 12, wherein the first compound is present in the ink receiving layer in an amount of at least 0.01 wt % and no more than 10 wt %.

14. An ink jet recording method comprising depositing droplets of an ink composition onto the recording medium of claim 12, so that they adhere to the recording medium to produce a record.

15. The record produced by the ink jet recording method of claim 14.

16. The recording medium according to claim 12, wherein compound A is present in the ink receiving layer in an amount of at least 0.01 wt % and no more than 10 wt %.

17. The recording medium according to claim 16, wherein the first compound is present in the ink receiving layer in an amount of at least 0.01 wt % and no more than 10 wt %.

18. The recording medium according to claim 12, wherein the first compound is present in the ink receiving layer in a weight ratio with respect to compound A of at least 1:25 and no more than 5:1.

19. The recording medium according to claim 12, wherein the first compound is selected from the group consisting of (1-1)

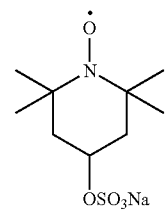

(1-2)

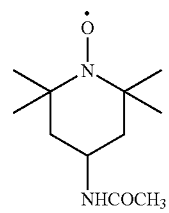

(1-3)

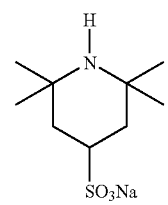

(1-4)

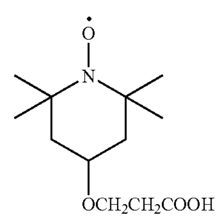

(1-5)

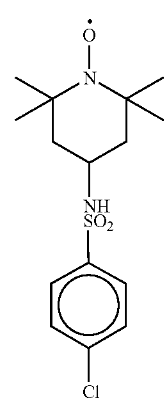

(1-6)

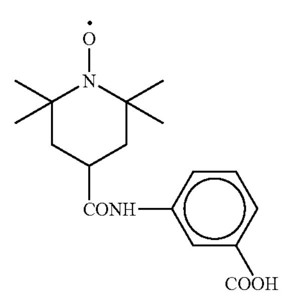

and

-continued (1-7)

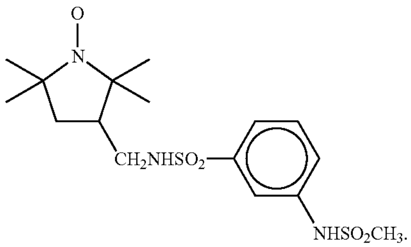

20. The recording medium according to claim 12, wherein compound A is the tertiary amine compound, said tertiary amine compound comprising either a substitutable cyclic tertiary amine or 1,4-diazabicyclo[2.2.2]octane and/or hexamethylenetetramine.

21. An ink jet recording method comprising depositing droplets of an ink composition onto a recording medium so that they adhere to the recording medium to produce a record, the ink composition comprising a colorant, water, a compound A selected from the group consisting of a hydrazide compound, a tertiary amine compound and an inorganic salt, and a first compound expressed by the following general formula

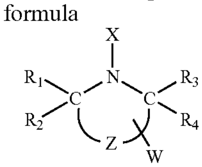

wherein W is a —$SO_2NH_2$ group, —$NHCOCH_3$ group, —$CONH_2$ group, —C═NH($NH_2$) group, —NHC═NH($NH_2$) group, —$SO_3H$ group, sulfuric ester group, —P(O)(OH)(OR), —P(O)$(OR)_2$, carbamoyl group or salt thereof, salt of a carboxyl group, salt of an amino group, salt of a phenolic hydroxyl group, polyethylene glycol ether group, salt of —CN═NH($NH_2$), or salt of —NHC═NH($NH_2$); R is an alkyl group or aryl group; X is a hydrogen, oxy radical, hydroxyl group, alkyl group, alkenyl group, alkynyl group, aryl group, acyl group, sulfonyl group, sulfinyl group, alkoxy group, aryloxy group, or acyloxy group; $R^1$, $R^2$, $R^3$, and $R^4$ are each a hydrogen or alkyl group; Z is a group of nonmetal atoms necessary to complete a five- to seven-member ring; and any two groups out of $R^1$ to $R^4$ and Z may bond together to form a five- to seven-member ring, wherein the hydrazide compound is a compound expressed by (i) the general formula $R^5CXNHNR^6R^7$, where $R^5$ is an alkyl group or aryl group; $R^6$ and $R^7$ are a hydrogen, alkyl group, or aryl group; and X is S or O, or (ii) the general formula $R^5SO^2NHNR^6R^7$, where $R^5$ is an alkyl group or aryl group; and $R^6$ and $R^7$ are a hydrogen, alkyl group, or aryl group or (iii) the general formula $R^5NHCXNHNR^6R_7$, where $R^5$ is an alkyl group or aryl group; $R^6$ and $R^7$ are a hydrogen, alkyl group, or aryl group; and X is S or O; wherein the inorganic salt is selected from the group consisting of $MS_2O_4$, $MSO_3$, $MS_2O_3$, $MPH_2O_2$, and $MPHO_3$, where M is an alkali metal or alkaline earth metal; and wherein the first compound is selected from the group consisting of (1-1)

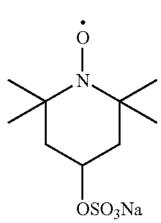

-continued (1-2)

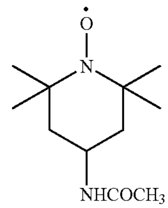

(1-3)

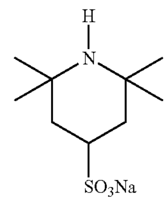

(1-4)

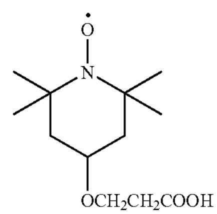

(1-5)

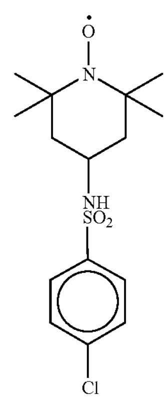

(1-6)

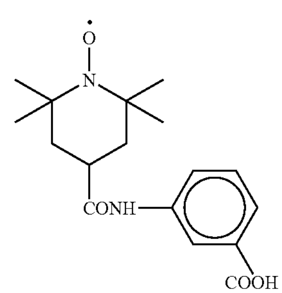

and (1-7)

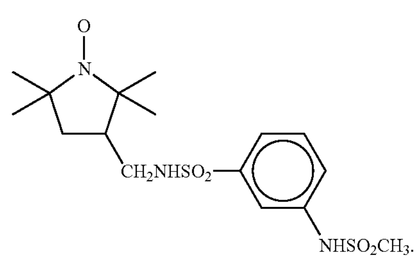

22. The ink jet recording method according to claim 21, wherein the first compound is contained in the ink composition in an amount of at least 0.05 wt % and no more than 10 wt %.

23. The ink jet recording method according to claim 22, wherein compound A is contained in the ink composition in an amount of at least 0.01 wt % and no more than 10 wt %.

24. The record produced by the ink jet recording method of claim 21.

25. An ink jet recording method comprising depositing droplets of an ink composition onto a recording medium so that they adhere to the recording medium to produce a record, the ink composition comprising a colorant, water, a compound A selected from the group consisting of a hydrazide compound, a tertiary amine compound and an inorganic salt, and a first compound expressed by the following general formula

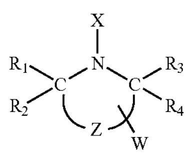

wherein W is a —$SO_2NH_2$ group, —$NHCOCH_3$ group, —C═NH($NH_2$) group, —NHC═NH($NH_2$) group, —$SO_3H$ group, sulfuric ester group, —P(O)(OH)(OR), —P(O)$(OR)_2$, carbamoyl group or salt thereof, salt of a carboxyl group, salt of an amino group, salt of a phenolic hydroxyl group, polyethylene glycol ether group, salt of —C═NH($NH_2$), or salt of —NHC═NH($NH_2$); R is an alkyl group or aryl group; X is a hydrogen, oxy radical, hydroxyl group, alkyl group, alkenyl group, alkynyl group, aryl group, acyl group, sulfonyl group, sulfinyl group, alkoxy group, aryloxy group, or acyloxy group; $R^1$, $R^2$, $R^3$, and $R^4$ are each a hydrogen or alkyl group; Z is a group of nonmetal atoms necessary to complete a five- to seven-member ring: and any two groups out of $R^1$ to $R^4$ and Z may bond together to form a five- to seven-member ring, wherein the hydrazide compound is a compound expressed by (i) the general formula $R^5CXNHNR^6R^7$, where $R^5$ is an alkyl group or aryl group; $R^6$ and $R^7$ are a hydrogen, alkyl group, or aryl group; and X is S or O, or (ii) the general formula $R^5SO_2NHNR^6R^7$, where $R^5$ is an alkyl group or aryl group; and $R^6$ and $R^7$ are a hydrogen, alkyl group, or aryl group or (iii) the general formula $R^5NHCXNHNR^6R^7$, where $R^5$ is an alkyl group or aryl group; $R^6$ and $R^7$ are a hydrogen, alkyl group, or aryl group; and X is S or O; wherein the inorganic salt is selected from the group consisting of $MS_2O_4$, $MSO_3$, $MS_2O_3$, $MPH_2O_2$, and $MPHO_3$, where M is an alkali metal or alkaline earth metal; and wherein the first compound is selected from the group consisting of, (1-1)

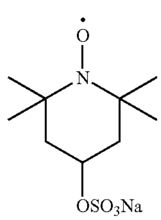

-continued (1-2)

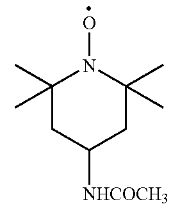

(1-3)

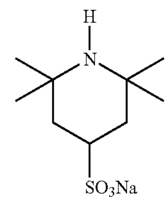

(1-4)

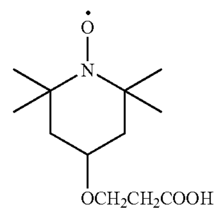

(1-5)

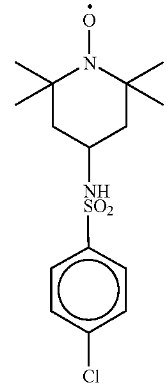

(1-6)

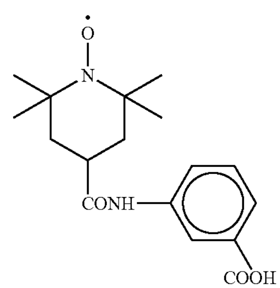

and (1-7)

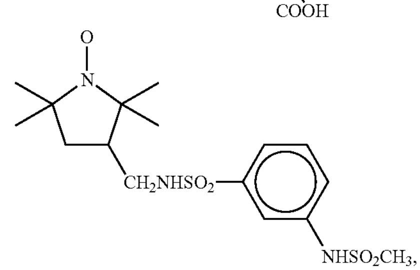

wherein the recording medium comprises an ink receiving layer provided on a substrate, wherein the ink receiving layer contains the compound A and the first compound.

26. The record produced by the ink jet recording method of claim 25.

27. An ink jet recording method comprising depositing droplets of an ink composition onto a recording medium so that they adhere to the recording medium to produce a record, the ink composition comprising a colorant, water, a compound A selected from the group consisting of a hydrazide compound, a tertiary amine compound and an inorganic salt, and a first compound expressed by the following general formula

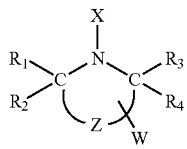

wherein W is a —$SO_2NH_2$ group, —$NHCOCH_3$ group, —$CONH_2$ group, —C═NH($NH_2$) group, —NHC═NH($NH_2$) group, —$SO_3H$ group, sulfuric ester group, —P(O)(OH)(OR), —P(O)$(OR)_2$, carbamoyl group or salt thereof, salt of a carboxyl group, salt of an amino group, salt of a phenolic hydroxyl group, polyethylene glycol ether group, salt of —C═NH($NH_2$), or salt of —NHC═NH($NH_2$); R is an alkyl group or aryl group; X is a hydrogen, oxy radical, hydroxyl group, alkyl group, alkenyl group, alkynyl group, aryl group, acyl group, sulfonyl group, sulfinyl group, alkoxy group, aryloxy group, or acyloxy group; $R^1$, $R^2$, $R^3$, and $R^4$ are each a hydrogen or alkyl group; Z is a group of nonmetal atoms necessary to complete a five- to seven-member ring: and any two groups out of $R^1$ to $R^4$ and Z may bond together to form a five- to seven-member ring, wherein the hydrazide compound is a compound expressed by (i) the general formula $R^5CXNHNR^6R^7$, where $R^5$ is an alkyl group or aryl group; $R^6$ and $R^7$ are a hydrogen, alkyl group, or aryl group; and X is S or O, or (ii) the general formula $R^5SO_2NHNR^6R^7$, where $R^5$ is an alkyl group or aryl group; and $R^6$ and $R^7$ are a hydrogen, alkyl group, or aryl group or (iii) the general formula $R^5NHCXNHNR^6R^7$, where $R^5$ is an alkyl group or aryl group; $R^6$ and $R^7$ are a hydrogen, alkyl group, or aryl group; and X is S or O; wherein the inorganic salt is selected from the group consisting of $MS_2O_4$, $MSO_3$, $MS_2O_3$, $MPH_2O_2$, and $MPHO_3$, where M is an alkali metal or alkaline earth metal; and wherein the first compound is selected from the group consisting of, (1-1)

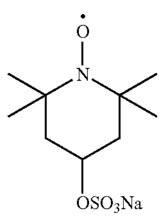

(1-2)

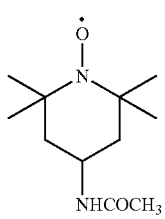

-continued (1-3)

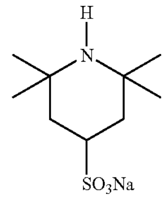

(1-4)

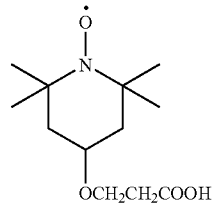

(1-5)

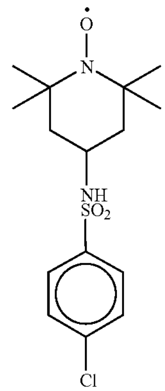

(1-6)

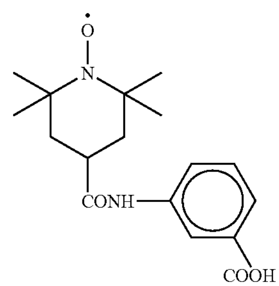

and (1-7)

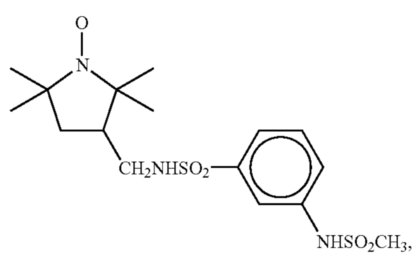

wherein compound A is the tertiary amine compound, said tertiary amine compound comprising either a substitutable cyclic tertiary amine or 1,4-diazabicyclo[2.2.2]octane and/or hexamethylenetetramine.

* * * * *